(12) United States Patent
Parsons

(10) Patent No.: US 11,872,631 B2
(45) Date of Patent: Jan. 16, 2024

(54) ADDITIVE MANUFACTURING OF COMPOSITE POWDERS

(71) Applicant: MASSACHUSETTS INSTITUTE OF TECHNOLOGY, Cambridge, MA (US)

(72) Inventor: Ethan Parsons, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/520,134

(22) Filed: Nov. 5, 2021

(65) Prior Publication Data

US 2022/0134429 A1  May 5, 2022

Related U.S. Application Data

(60) Provisional application No. 63/110,023, filed on Nov. 5, 2020.

(51) Int. Cl.
| | |
|---|---|
| *B22F 9/04* | (2006.01) |
| *B33Y 10/00* | (2015.01) |
| *B33Y 40/10* | (2020.01) |
| *B33Y 70/10* | (2020.01) |
| *B22F 10/28* | (2021.01) |
| *B22F 1/05* | (2022.01) |

(52) U.S. Cl.
CPC ............ *B22F 9/04* (2013.01); *B22F 1/05* (2022.01); *B22F 10/28* (2021.01); *B33Y 10/00* (2014.12); *B33Y 40/10* (2020.01); *B33Y 70/10* (2020.01); *B22F 2009/041* (2013.01); *B22F 2301/052* (2013.01); *B22F 2304/10* (2013.01)

(58) Field of Classification Search
None
See application file for complete search history.

(56) References Cited

U.S. PATENT DOCUMENTS

| | | |
|---|---|---|
| 2016/0271878 A1 | 9/2016 | Nuechterlein et al. |
| 2016/0279703 A1 | 9/2016 | Clare et al. |
| 2018/0044765 A1* | 2/2018 | Liu .......................... C22C 1/04 |
| 2021/0318472 A1* | 10/2021 | Song ....................... C22C 25/00 |

FOREIGN PATENT DOCUMENTS

WO  WO-2020046739 A2 *  3/2020  ............. C22C 25/00

* cited by examiner

*Primary Examiner* — Anthony M Liang
(74) *Attorney, Agent, or Firm* — Honigman LLP

(57) ABSTRACT

Compositions and methods of making compositions for additive manufacturing of composite powders including metal ceramic alloyed material is described.

5 Claims, 32 Drawing Sheets

Ball milled Al-Si10-Mg + 16% TiB₂ (initial powder)

Printed density cubes (1 cm³)

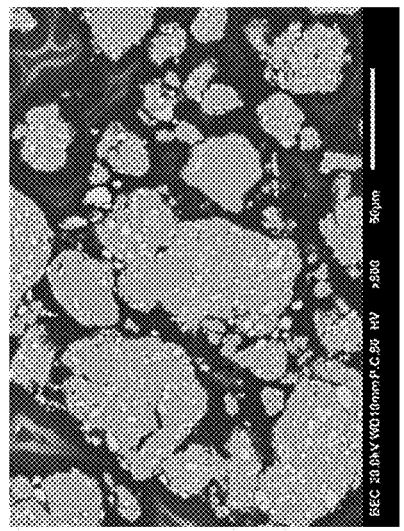
t = 90 min  [TiB$_2$] = 28.2% after sieving
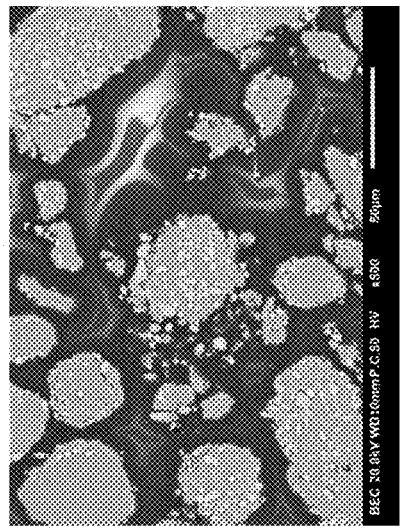
t = 45 min  [TiB$_2$] = 23.2% after sieving
FIG. 16
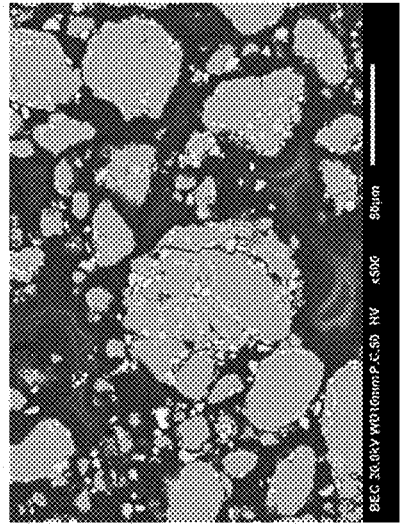
t = 25 min

ADDITIVE MANUFACTURING OF COMPOSITE POWDERS

CLAIM OF PRIORITY

This application claims priority to U.S. Provisional Patent Application No. 63/110,023, filed Nov. 5, 2020, which is incorporated by reference in its entirety.

STATEMENT OF GOVERNMENT SUPPORT

This invention was made with Government support under Grant No. FA8702-15-D-0001 awarded by the U.S. Air Force. The Government has certain rights in the invention.

FIELD OF THE INVENTION

The invention features compositions and methods of making compositions for additive manufacturing of composite powders.

BACKGROUND

Precision aerospace and other high-performance applications for which system weight is critical can require lightweight structural materials with high stiffness, high strength and low and tunable thermal expansion. One ideal class of material for these applications is metal matrix composites (MMCs), in which ceramic particles reinforce a metal matrix, superimposing the toughness of the metal with the stiffness, strength, and low thermal expansion of the ceramic. Relative to the unreinforced metal, improvements in specific stiffness and strength of over 100% can be possible, with similar gains in thermal stability, abrasive wear resistance, and fatigue strength.

SUMMARY

In one aspect, a method of manufacturing a composite powder can include milling a metal powder and a ceramic powder to form an alloyed powder.

In another aspect, a composite material can include an alloyed powder including a plurality of particles including a metal and a plurality of microparticles of a ceramic substantially uniformly distributed in a metal matrix of the metal, wherein the plurality of particles is monodisperse.

In another aspect, a method of manufacturing an article can include laser sintering a plurality of particles of an alloyed powder, the plurality of particles including a metal and a plurality of microparticles of a ceramic substantially uniformly distributed in a metal matrix of the metal, wherein the plurality of particles is monodisperse.

In certain circumstances, milling can include includes high energy ball milling or planetary ball milling.

In certain circumstances, milling can include deforming and hardening the metal powder and alloying the ceramic powder to form the alloyed powder.

In certain circumstances, milling can include ball milling with steel or tungsten carbide balls.

In certain circumstances, the method can include degassing the alloyed powder.

In certain circumstances, the alloyed powder can include a monodisperse alloyed powder. For example, the monodisperse alloyed powder can include a metal matrix derived from the metal powder, the metal matrix containing microparticles derived from the ceramic powder substantially uniformly distributed in the metal matrix.

In certain circumstances, the metal powder can include aluminum, steel or titanium.

In certain circumstances, the ceramic powder can include a titanium boride, a titanium carbide, a boron carbide, a boron nitride, a boron carbide, or a boron suboxide.

In certain circumstances, the metal matrix can be derived from a metal powder, the microparticles of the ceramic derive from the ceramic powder.

In certain circumstances, the metal include aluminum.

In certain circumstances, the ceramic can include a titanium boride, a titanium carbide, a boron carbide, a boron nitride, a boron carbide, or a boron suboxide.

In certain circumstances, the metal includes aluminum and the ceramic includes a titanium boride.

In certain circumstances, the plurality of particles can have a size range of 10 microns to 100 microns. For example, the plurality of particles can have an average size range of 20 microns to 60 microns.

In certain circumstances, the microparticles can have an average size range of 1 micron to 10 microns.

In certain circumstances, the particles can include 10% to 40% ceramic by volume.

In certain circumstances, the particles can include 10% to 50% ceramic by weight.

In certain circumstances, the particles can include less than 1% tungsten impurity.

Other aspects, embodiments, and features will be apparent from the following description, the drawings, and the claims.

BRIEF DESCRIPTION OF DRAWINGS

FIG. 16 depicts a time sequence of micrographs showing ceramic content as a function of milling time.

DETAILED DESCRIPTION

Figure 1:
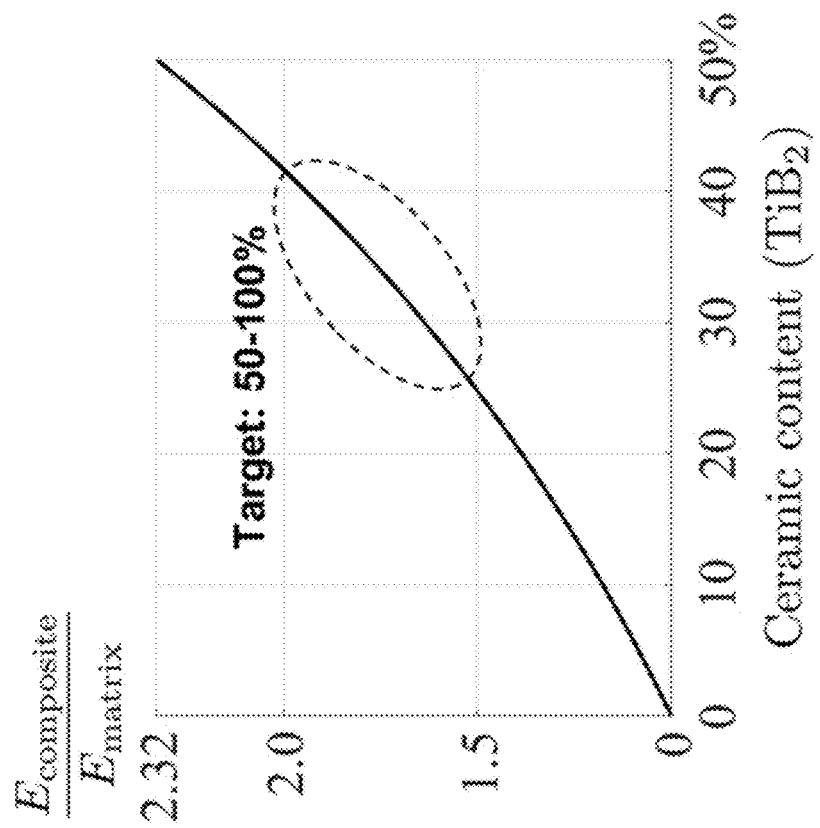
FIG. 1 depicts a graph showing an example of a target mechanical performance of a metal matrix composite material including a range of ceramic content.

Selective laser melting of metal matrix composites can include 30% or higher content of ceramic in metal. A mechanically alloyed feedstock powder can be 3d printed by a layer-by-layer building approach employing SLM. The alloyed feedstock powder can be aluminum alloyed with particles of $TiB_2$. The prior material—Al reinforced with SiC particles—was impractical. Applications were limited by cost, availability and machining difficulty. Al reinforced with SiC particles have properties of 50% particles increase stiffness by 2.3× but decreases thermal expansion from 23.6 to 9.6.

The alloyed powder described herein is a combination of a stiff, strong, brittle ceramic micropowder (about 5 microns average particle size) with ductile aluminum powder (about 40 microns average particle size). Laser consolidation of the alloyed powder can form a consolidated composite (stiff, strong and ductile composite with complex geometry in a single operation) with 99% relative density.

In precision systems, the limiting material performance is typically not strength, but specific stiffness, the ratio of the uniaxial modulus to material density. In fact, there can be a large margin on strength. Specific stiffness can be critical because deflections in precision systems must be minimal, weight budgets are stingy, and natural vibration frequency should be maximized to reduce the need for complex vibration isolation systems. Moreover, in space systems, payload is typically only 1% of the total launch mass. Thus, small decreases in system launch mass can provide a substantial increase in the payload capacity to orbit.

The resulting materials can provide strength, temperature resistance, and corrosion resistance for applications such as turbines, nuclear reactors, armor, and pressure vessels.

A method of manufacturing a composite powder can include milling a metal powder and a ceramic powder to form an alloyed powder. In certain circumstances, milling can include deforming and hardening the metal powder and alloying the ceramic powder to form the alloyed powder. These two distinct steps can help improve processing efficiencies and reduce the presence of impurities. The alloying step can occur after the metal powder is hardened by about 30%, 40%, 50% or 60%.

In another aspect, a method of manufacturing an article can include laser sintering a plurality of particles of an alloyed powder, the plurality of particles including a metal and a plurality of microparticles of a ceramic substantially uniformly distributed in a metal matrix of the metal, wherein the plurality of particles is monodisperse. The article can be manufactured by powder bed fusion. The plurality of particles can flow, improving processability. This is in part a result of the monodisperse nature of the alloyed powder. The method of manufacturing can include depositing a lawyer of the product before consolidating the particles.

An additional step of preparing the alloyed powder can include a degassing step. The degassing step can include applying heat, applying heat under an inert atmosphere, or applying heat under reduced pressure or vacuum, or combinations thereof.

The resulting alloyed powder can include a monodisperse alloyed powder. The monodisperse alloyed powder can include a metal matrix derived from the metal powder. The metal matrix containing microparticles can be derived from the ceramic powder substantially uniformly distributed in the metal matrix.

The alloyed powder can include a plurality of particles including a metal and a plurality of microparticles of a ceramic substantially uniformly distributed in a metal matrix of the metal, wherein the plurality of particles is monodisperse. The plurality of particles can have a size range of 10 microns to 100 microns, for example, an average size range of 20 microns to 60 microns. The microparticles have an average size range of 1 micron to 10 microns, for example, 1 micron, 2 microns, 3 microns, 4 microns, 5 microns, 6 microns, 7 microns, 8 microns, 9 microns, or 10 microns. The particles include 10% to 40% ceramic by volume.

In certain circumstances, the metal powder can include aluminum, steel, or titanium. For example, the metal powder can be an aluminum, steel, titanium or nickel-based alloy. The metal can have varying strength, toughness, and temperature resistance.

In certain circumstances, the ceramic powder can include a titanium boride, a titanium carbide, a boron carbide, a boron nitride, a boron carbide, or a boron suboxide.

A variety of mills can be employed. In general, high energy milling leads to the formation of the alloyed powders described herein. For example, milling can include high energy ball milling or planetary ball milling. In certain circumstances, milling includes ball milling with steel or tungsten carbide balls.

In certain circumstances, the metal can include aluminum and the ceramic can include a titanium boride, a titanium carbide, a boron carbide, a boron nitride, a boron carbide, or a boron suboxide. For example, the metal can include aluminum and the ceramic includes a titanium boride.

The process described herein can reduce impurities. For example, the particles can include less than 1% tungsten impurity.

Metal matrix composites (MMCs) can provide an ideal solution, but prior materials could not be 3D printed. See FIG. 1. The MMC can have improved yield strength, fatigue strength, creep strength, and wear resistance. The MMC materials described herein have a potential for lightweighting and can improve performance and/or energy efficiency in many applications that require isotropy, elevated service temperature, dimensional stability, strength, wear resistance, or fracture toughness. For example, yield strength, fatigue strength, creep and wear resistance can be substantially improved by employing the materials described herein. Heat pipes, conformal cooling components, pistons, connecting rods, and various struts, brackets, housings, nozzles, and manifolds are examples of structures that can be manufactured using the materials and methods described herein.

Figure 2:
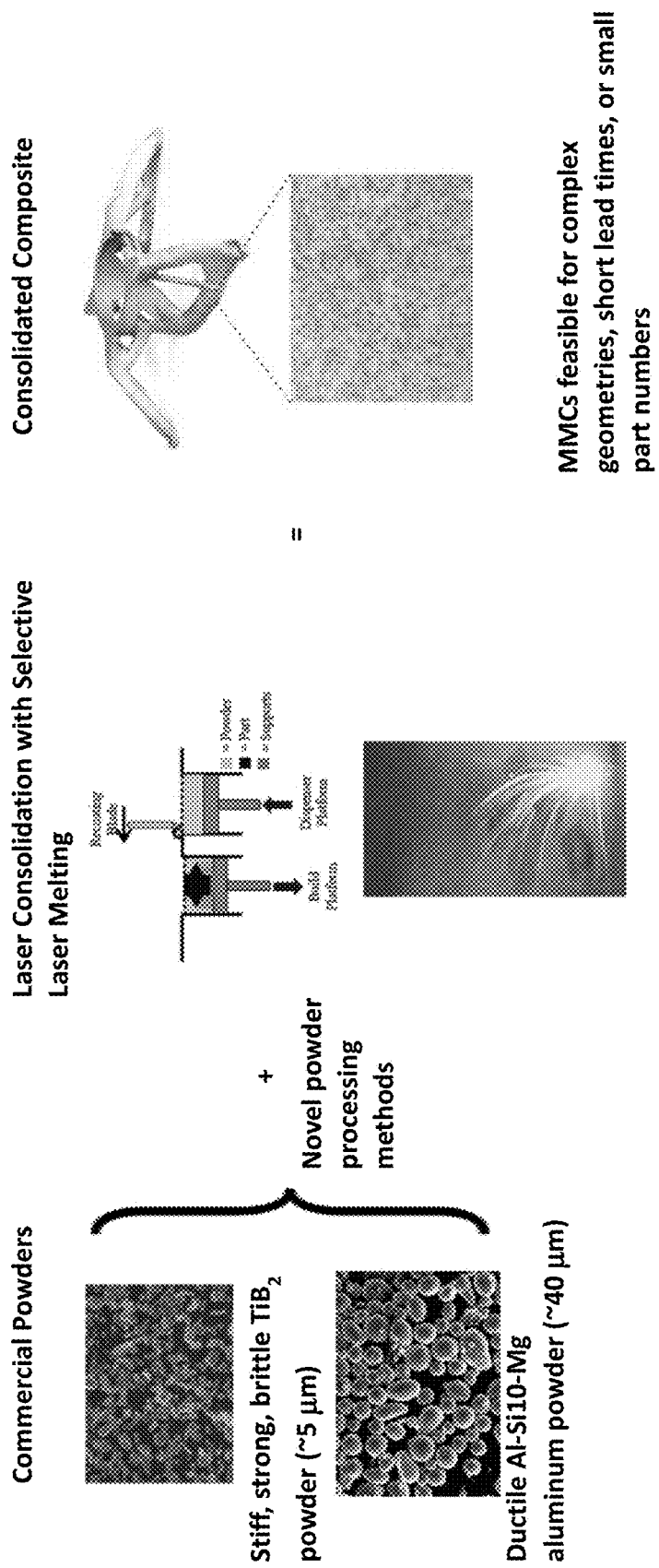
FIG. 2 depicts a scheme for manufacturing a consolidated composite.

As described herein, a method to fabricate highly-reinforced MMCs with additive manufacturing (AM) and resulting composites can enable components with complex, structurally optimized shapes to be produced on demand with minimal investment in raw materials. With this method, highly-reinforced, high-quality composite powders are fabricated with solid state processing and then laser consolidated to nearly full density. Common, cost-effective methods of powder production are used that could be scaled to the commercial level. Moreover, after consolidation in a commercial AM machine, the material microstructure is very similar in morphology and composition to the particulate MMCs that have proven commercially viable. Referring to FIG. 2, a consolidated composite having a stiff, strong and ductile composite with complex geometry can be manufactured in a single operation. The powder processing methods described herein can produce powder materials that can be laser consolidated in a reproducible and predictable manner to form the consolidated composite. Importantly, the technical solution described herein leads to the manufacture of MMCs with high ceramic content for selective laser melting (SLM). SLM is a commercial additive manufacturing process in which thin layers of metal powder can be repeatedly spread over a build plate and consolidated by full melting with a high-power laser. As described below, starting with commercial aluminum and titanium diboride powders, a feedstock powder has been developed that can be optimized for performance in SLM machines. The resulting materials have exceptional specific stiffness and can be used in components requiring complex shapes, short lead times, or small part numbers. The composite powder morphology similar standard SLM powders, making the composite powder suitable for laser consolidation with SLM. For example, a stiff, strong, brittle ceramic micropowder (for example, having a particle size of about 5 μm) can be alloyed with ductile Al—Si10-Mg, an aluminum powder (for example having a particle size of about 40 μm) using the methods described herein.

In certain circumstances, the methods and composite materials describe herein can include aluminum alloy MMCs because aluminum can be one of the best material for lightweight structural applications. Aluminum is substantially less dense than other common alloys, and it is corrosion resistant, thermally stable, and affordable. However, some or all aspects of the methods and composite materials described herein can apply to other alloyed powders, such as steel or titanium powders, which can be simpler to process than aluminum powders.

Figure 3:
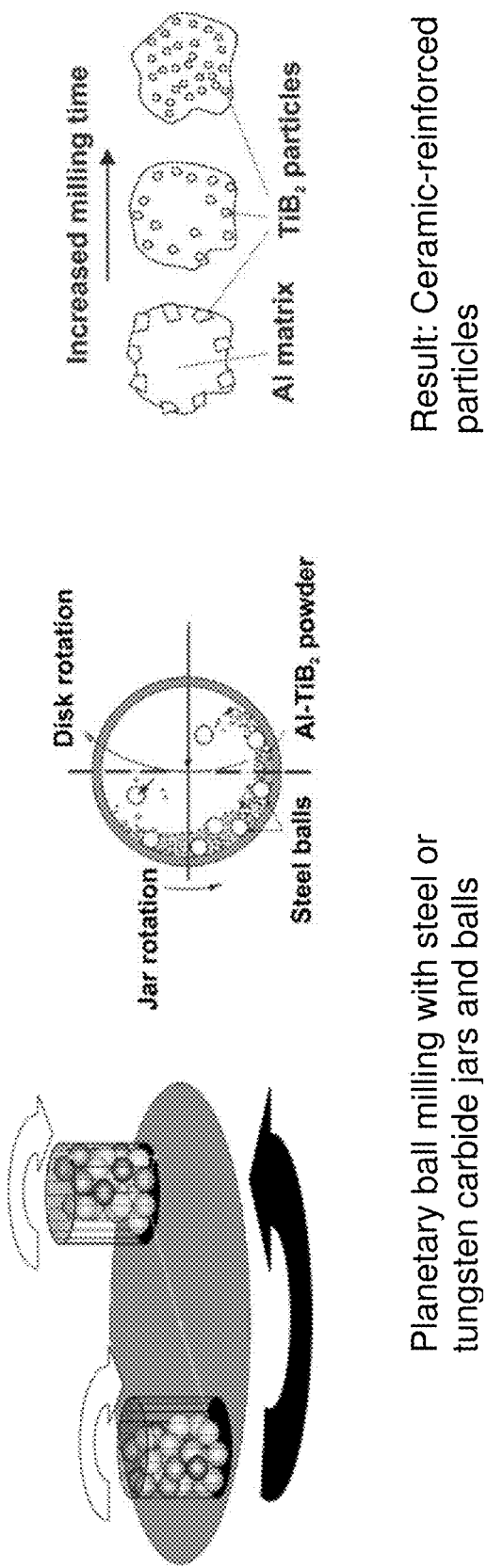
FIG. 3 depicts a schematic drawing showing the transformation of a mixture to ceramic-reinforced particles.

As exemplified in FIG. 3, ceramic-reinforced powders developed specifically for additive manufacturing can be produced my mechanical alloying. For example, planetary ball milling can be used to manufacture composite particles, such that each particle in the powder bed is itself a composite. The morphology promotes distribution, wetting, and bonding of the ceramic microparticles because the metal and ceramic are uniformly mixed and in close contact prior to the start of the process. The resulting materials have monomodal particle size distributions, which is a morphology that can have good flow characteristics, enabling an SLM machine to spread thin, uniform layers (discussed below). Ceramic loadings of up to 40 or 50% of the metal matrix material can be achieved by the methods described herein. The process promotes distribution, wetting, and bonding of small ceramic particles. The improved powder flowability in an SLM machine is readily apparent, relative to bimodal particle size distributions. Bimodal distribution of particles are milled to produce a single-mode narrow size distribution. One important aspect of the discovery described herein is that increased milling time can lead to smaller ceramic particles in a matrix of metal.

Figure 4:
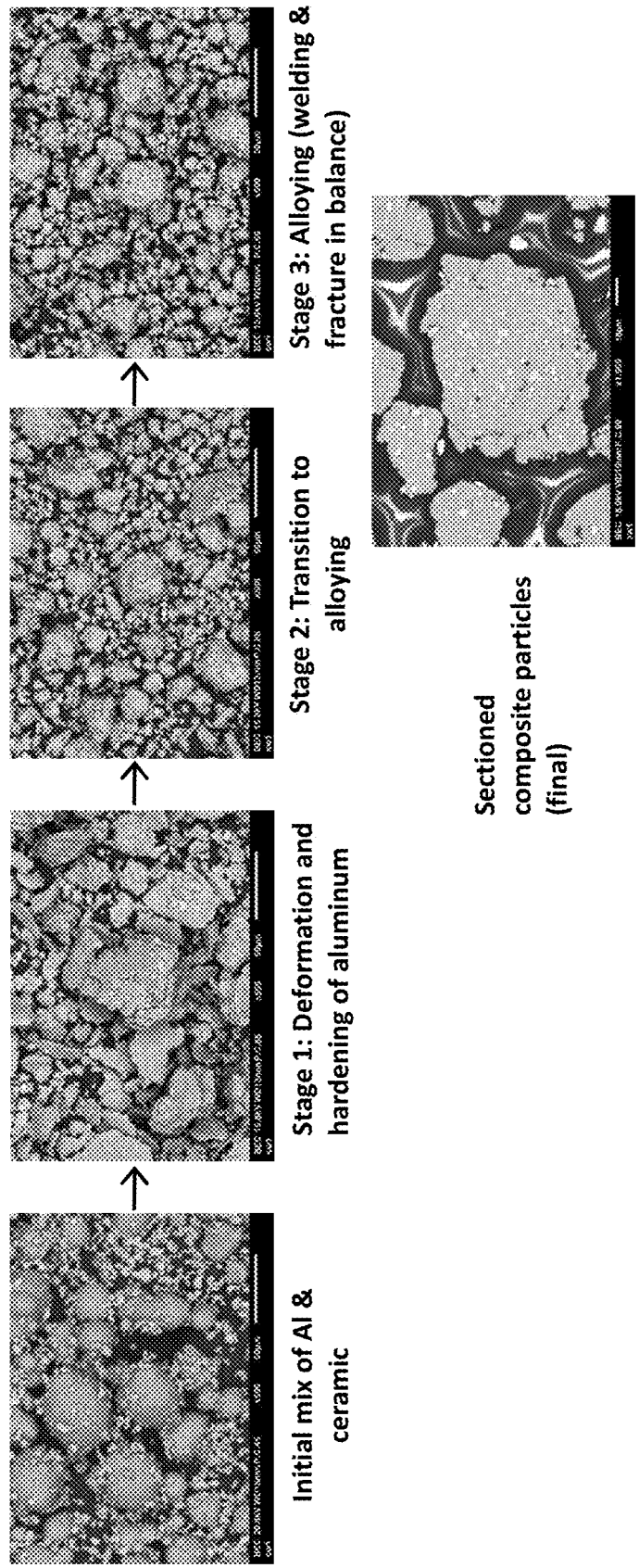
FIG. 4 depicts a series of micrographs that show a mechanical allowing approach to generate materials that can be used additive manufacture.

Referring to FIG. 4, a series of micrographs demonstrate that, with ball milling, the powder material is being repeatedly deformed, fractured, and rewelded in order to form a homogeneous blend. The original spherical shape of the gas atomized powder is not necessarily maintained, but a selection of ball milling parameters leads to a preservation of the average size of the particles that can then be mounted and polished. The micrographs allow for the verification that each particle now contains a uniform distribution of ceramic material. Chemical analysis shows content of ceramic in composite powder similar to content in initially mixed powder.

Figure 5:
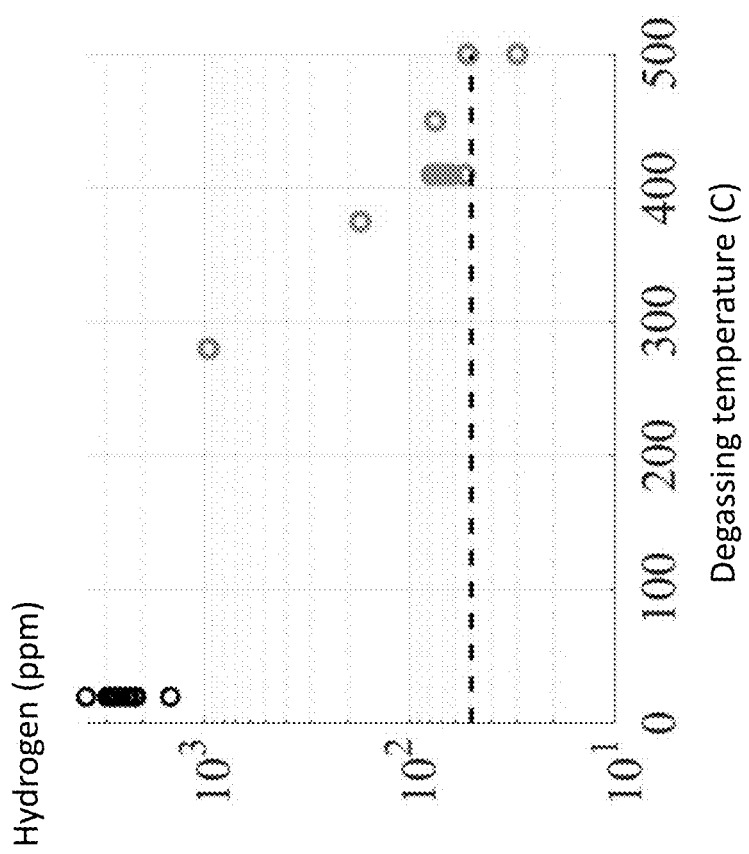
FIG. 5 depicts a graph showing hydrogen content of a powder after degassing at different temperatures.

Powders can be degassed to remove hydrogen, which can be an artifact of the ball milling process because of the use of lubricants. Referring to FIG. 5, a high vacuum furnace with a ramp and hold temperature profile over a period of 8 to 20 hours at temperatures of 350° C. to 500° C. was used to evaluate the removal of hydrogen from the powder. Degassing reduced hydrogen content from about 2500 ppm to as low as 29 ppm. Additional experiments were conducted at temperatures of 410° C. to 500° C. for time periods of 14 hours to 20 hours. Chemical analysis before and after show that all powders showed a decrease in hydrogen content of about two orders magnitude, down to around 50-60 ppm, close to gas atomized Al—Si10-Mg. Surprisingly, the composite powder showed no evidence of sintering, even at 500° C. After degassing, the apparent density was about same, and flowability typically improved. The hydrogen content of the materials follow:

Gas atomized $AlSi_{10}Mg$: 28.5 ppm

Blended $AlSi_{10}Mg+TiB_2$: 51.5 ppm

Milled $AlSi_{10}Mg+TiB_2$: up to 3750 ppm

Initial experiment, degassing of milled $AlSi_{10}Mg+TiB_2$: 75.6 ppm

Stearic acid boils at 184 C

Traditionally, water desorption from Al and its alloys is associated with the release of surface physisorbed and chemisorbed water, and the decomposition of hydroxide phases, e.g., $Al(OH)_3$ and $AlOOH$, which may present on the outer surface oxide layer.

Figure 6A:
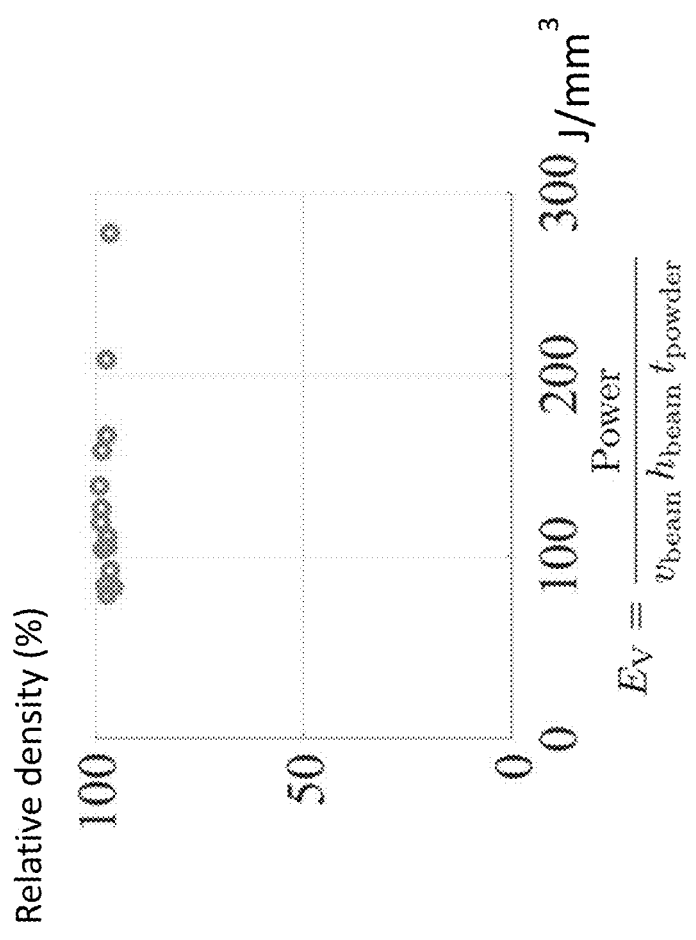
FIG. 6A depicts a graph showing the consolidation density of a composite described herein.
Figure 6B:
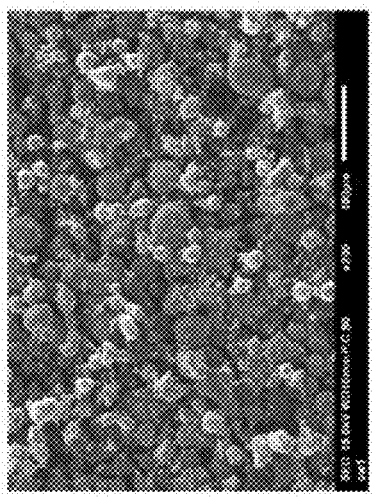
FIG. 6B depicts a micrograph and particle size distribution of a mixture of metal powder and a ceramic.
Figure 6B:
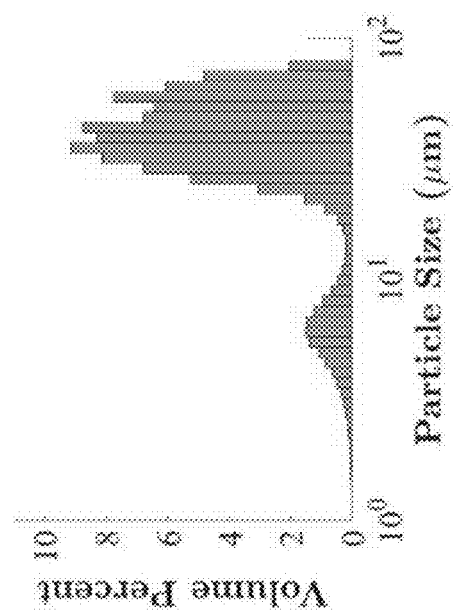
Figure 6C:
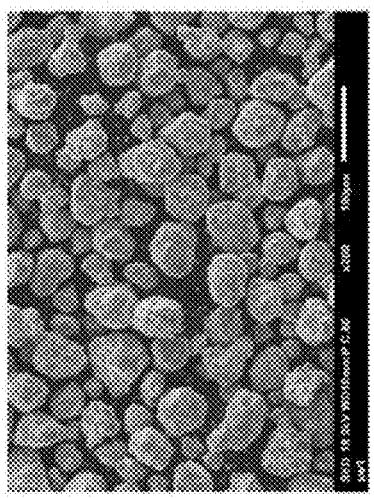
FIG. 6C depicts a micrograph and particle size distribution of a mixture of metal powder and a ceramic after being milled to form the alloyed powder described herein.
Figure 6C:
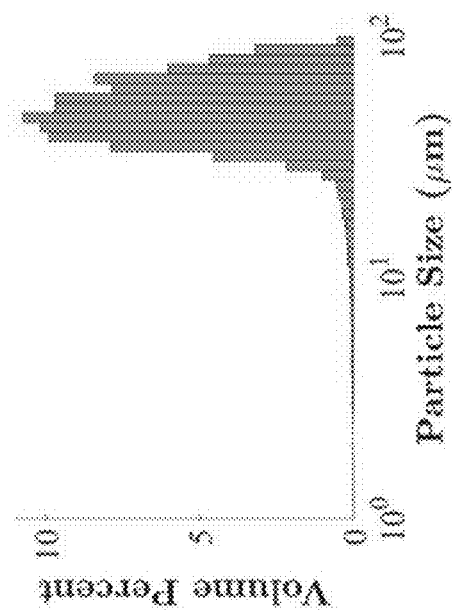
Figure 7:
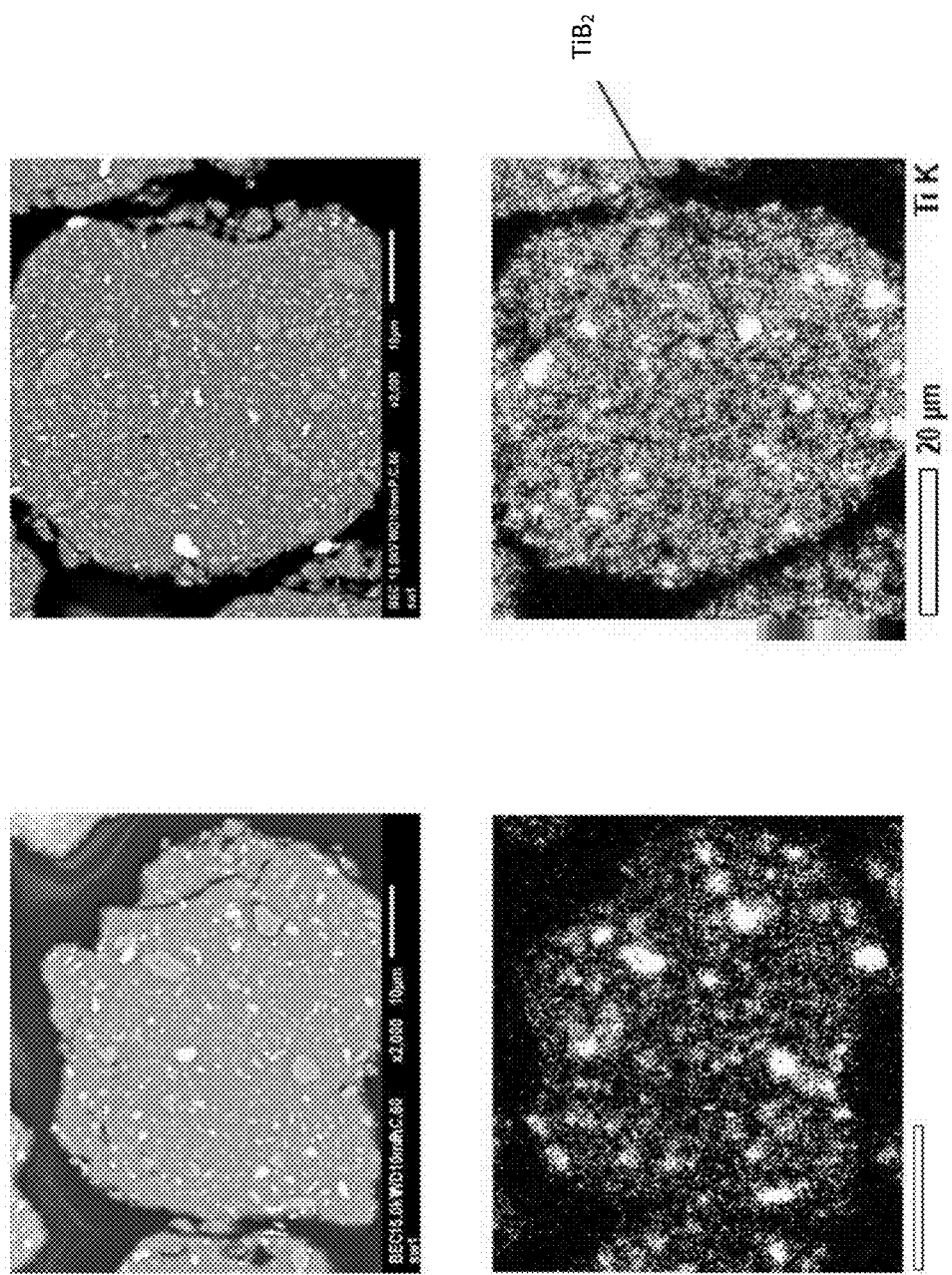
FIG. 7 depicts SEM and EDS images of a composite powder.
Figure 10:
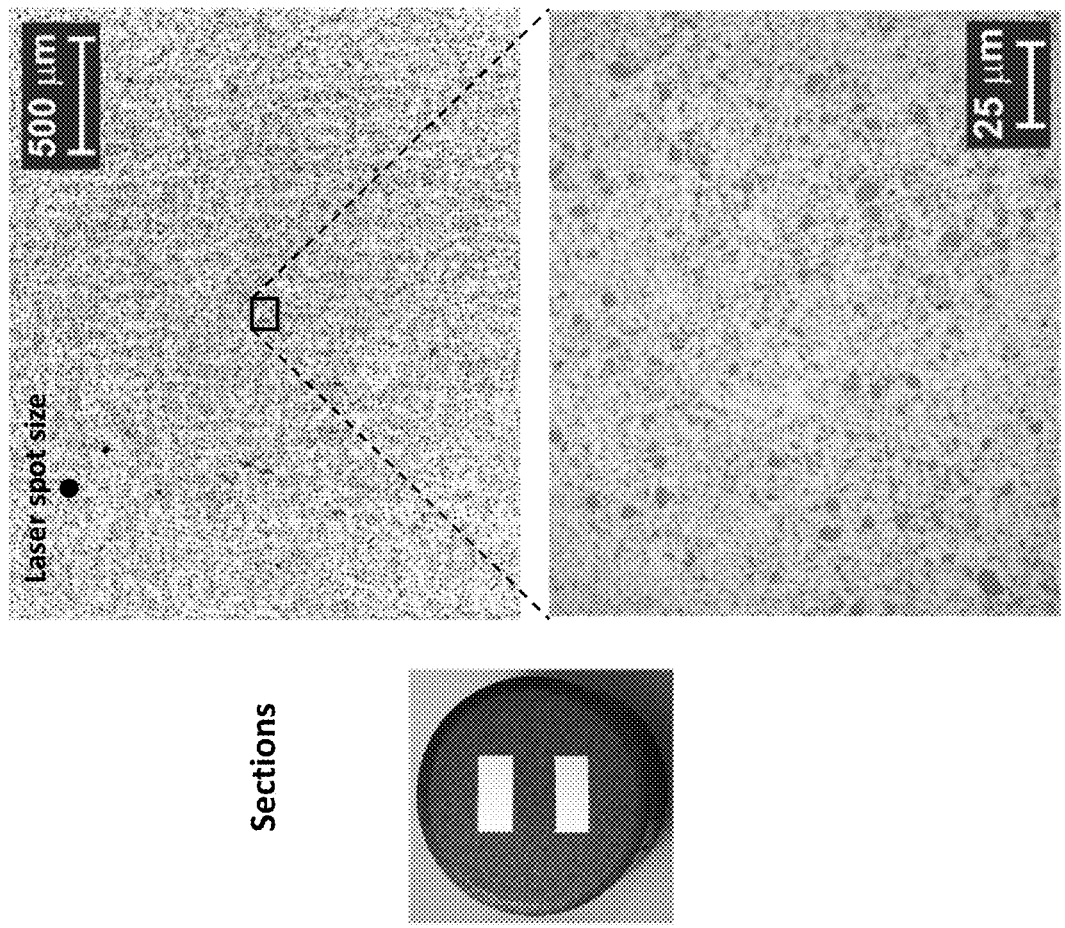
FIG. 10 depicts micrographs of a final densified product.

As shown in FIG. 6A, ball milled Al—Si10-Mg including 16% titanium boride, degassed at 410 C has high density, greater than 99% (99.2%) of relative density after SLM, an unexpected result for the composite powder because other microparticle-reinforced powders have not achieved virtually full density. The samples showed no sign of cracking. The articles were small, well distributed, and well bonded. The composite powder can be used without using tricks such as preheating of the powder bed or elaborate scan strategies. It was also found that lower energy densities than prior work that did not cause coarsening of the microstructure that reduces strength. A 17.69% (18%) improvement in modulus predicted at 16% was observed. FIG. 6A shows density of final product with varied laser power. FIGS. 6B and 6C depict the dispersity of the starting powder mixture and the final alloyed powder. Referring to FIG. 7, SEM and EDS analysis of the alloyed powder show full, uniform incorporation of ceramic powder in a metal matrix for 16% TiB$_2$ and 30% TiB$_2$. FIG. 10 shows micrographs of a final densified product (Al including 16% TiB$_2$). The microparticle-reinforced powder was consolidated at virtually full density.

Figure 11A:
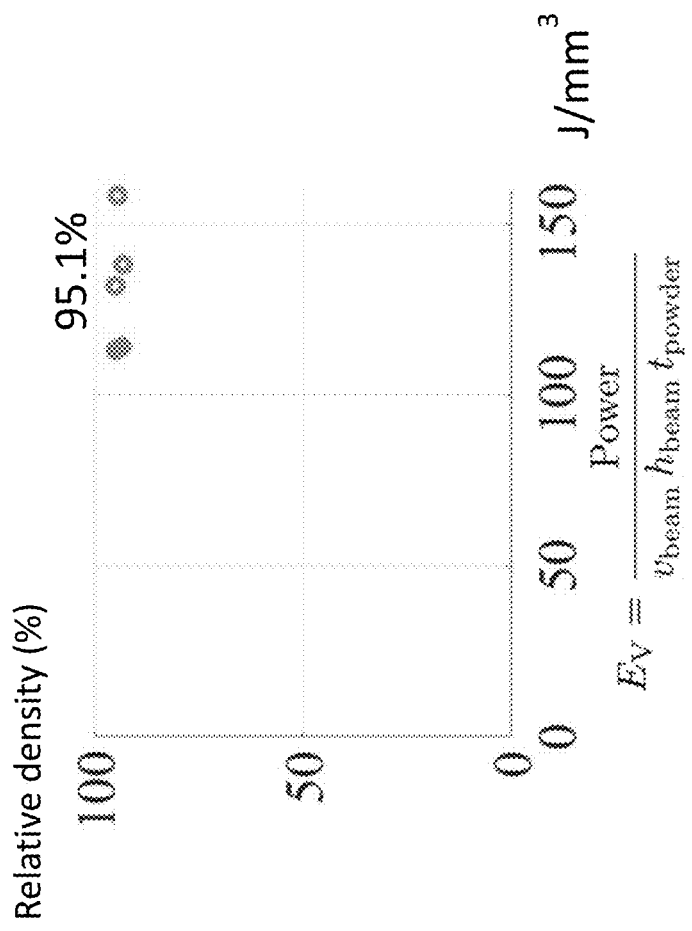
FIG. 11A depicts a graph showing the consolidation density of a composite described herein.
Figure 11B:
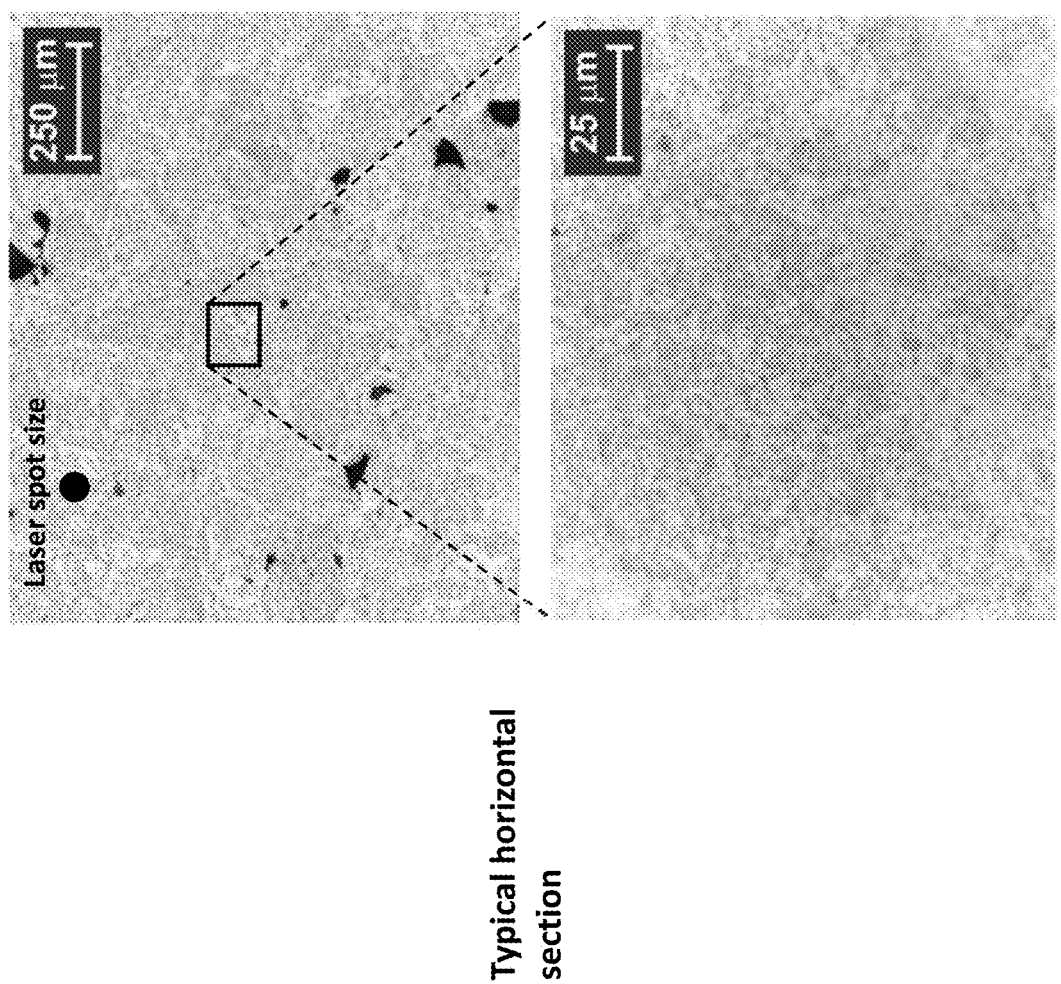
FIG. 11B depicts micrographs of a final densified product.

Properties of an SLM product of an aluminum—30% TiB$_2$ powder are shown in FIG. 11A and FIG. 11B. Fully dense consolidation was accomplished in sections, but defects correlated with intermetallics that formed in powder during degassing. Initial results at higher ceramic content are promising, artifact turbulent melt pool behavior was present with large defects. One difference here is that, not only was the ceramic content increased, but the degassing temperature was also increased in an effort to remove additional hydrogen. It turns out that with degassing of powders, unexpectedly, sub-optimum consolidation to intermetallics can form at excessive degassing temperatures.

Figure 12:
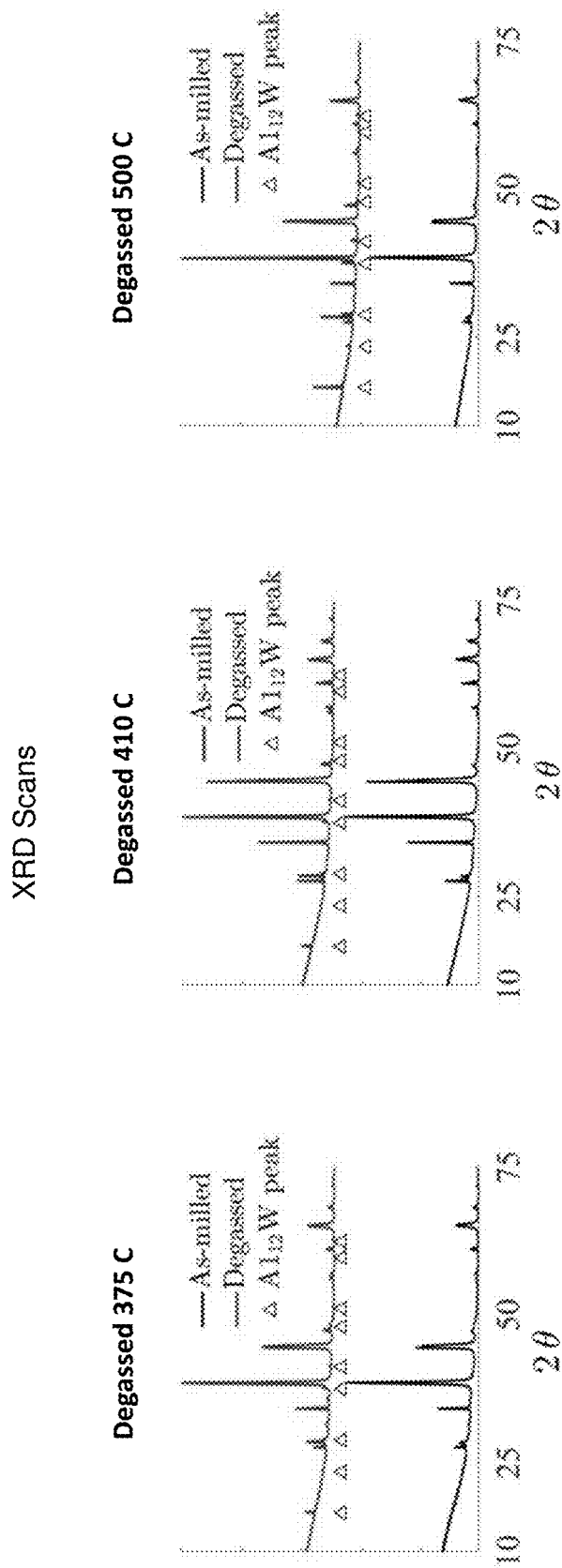
FIG. 12 depicts graphs showing x-ray diffraction scans of powder samples degassed at different temperatures.

A source of porosity in densified products was identified. It was found that WC from milling media reacts to form intermetallic Al$_{12}$W during degassing. Referring to FIG. 12, the Al$_{12}$W peak intensities and crystallite size increase with increasing degassing temperature above 350 C. The 30% powders that have been printed had 1-3% WC content caused by wear of the milling media. WC may not be a problem by itself. Others have added higher contents intentionally and shown good consolidation results.

Figure 13:
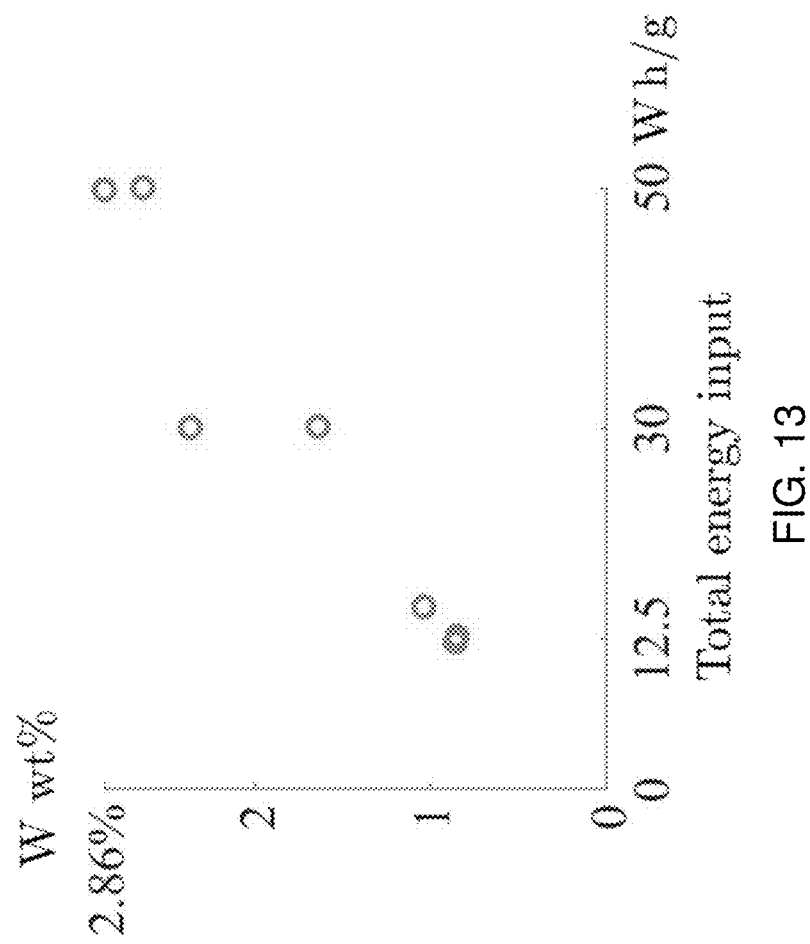
FIG. 13 depicts a graph showing tungsten carbide content in powder with 30% $TiB_2$ after milling.
Figure 14:
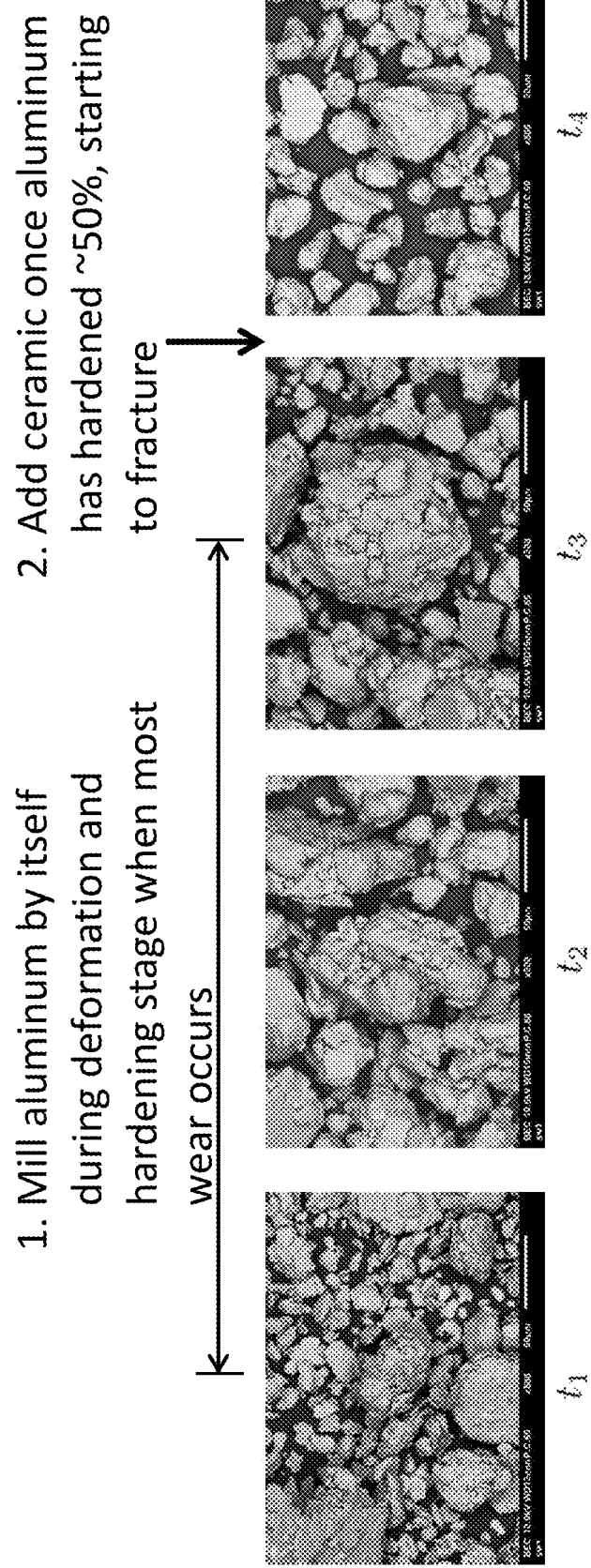
FIG. 14 depicts a two-step milling process to reduce milling media content.

Referring to FIG. 13, tungsten content can be reduced to less than 1% by decreasing energy input during the milling process. Other factors that impact the tungsten content of the alloyed powder can include ceramic particle size, balls-to-powder ratio (BPR), or the amount of milling additive (for example, stearic acid).

Another approach to reduce or eliminate contamination from milling media includes modifying the process. For example, a two-step milling process can reduce or eliminate most milling media content. In a first step, aluminum is milled by itself during deformation and hardening stage when most wear occurs. In a second step, ceramic powder is added once aluminum has hardened, for example, about 50% and starting to fracture. The two step approach can lead to an impurity content of less than about 0.25 wt %.

Figure 15A:
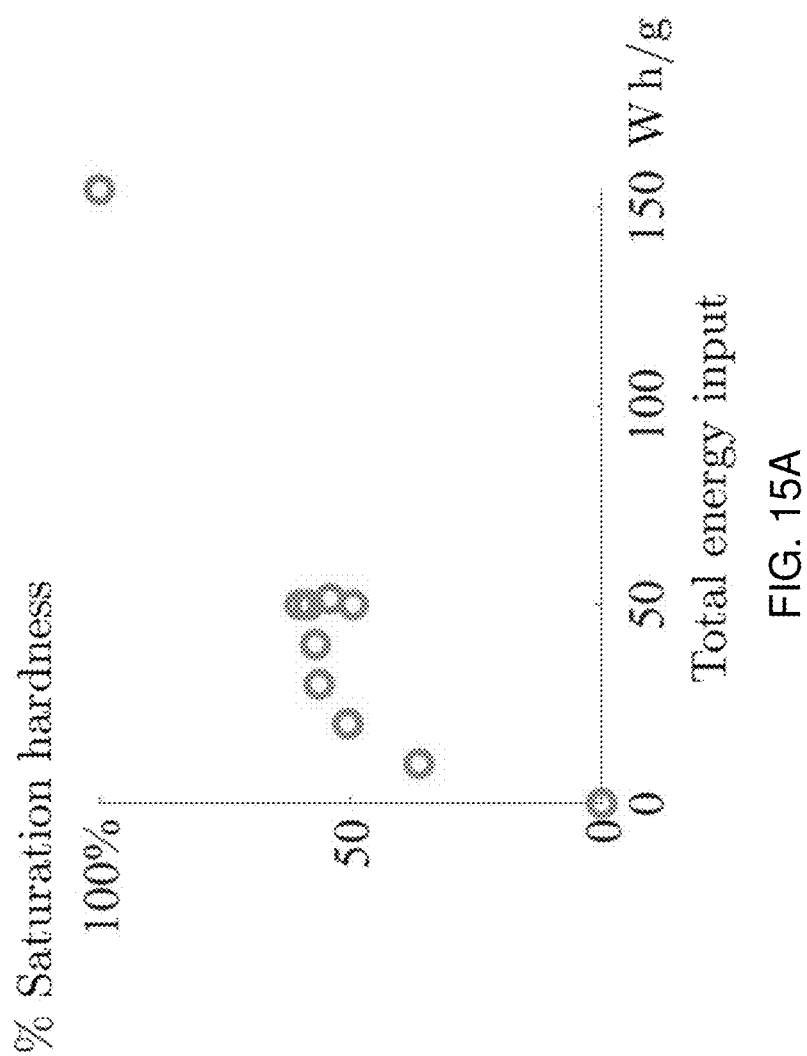
FIG. 15A depicts a graph showing metal hardness as a function of milling energy.

The progression of metal hardness as a function of milling energy is shown in FIG. 15A. The Hardness estimated from XRD crystallite size and Hall-Petch model of grain boundary strengthening according to the equation:

$$\sigma_y = \sigma_0 + \frac{k}{\sqrt{d}}$$

Figure 15B:
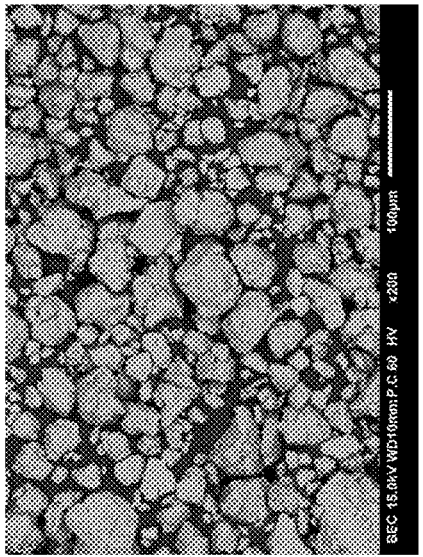
FIG. 15B depicts a micrograph showing a powder at 50% saturation hardness.

Referring to FIG. 15B, a powder at 50% saturation hardness, after about 5 to 15 hours of milling, can then be used in a second step of alloying with a ceramic powder in the second step described above.

Figure 17:
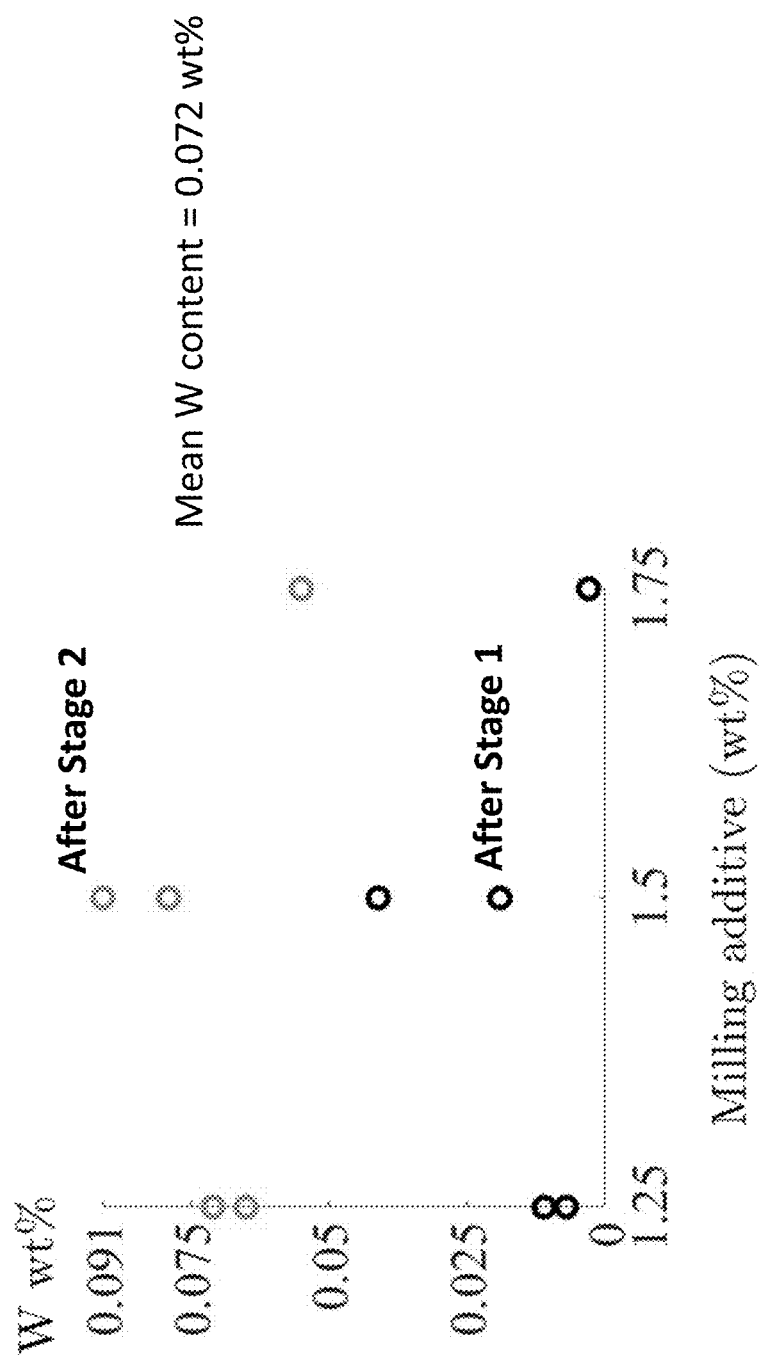
FIG. 17 depicts a graph showing impurity content with a two-stage milling process.

Referring to FIG. 16, micrographs of the powder after milling with the metal powder first milled for 5 to 15 hours show alloying as time progresses from 25 minutes to 90 minutes. A loading of 30% TiB$_2$ that is milled for 90 min with WC balls and bowls have a content of at least 28% TiB$_2$. Thus, incorporation of the ceramic is nearly complete by a 90 minute second step in the two step process. Referring to FIG. 17, impurity content with a two-stage milling (using WC bowls and balls) can be reduced by 50× to an average of about 0.07 wt %. The tungsten content can be further reduced by using smaller ceramic particles, lower BPR, and seasoned jars. The impurity content can increase with larger ceramic particles, high BPR, and clean jars. The milling conditions can be properly adjusted so that the ball coating remains relatively slight during processing and is continuously exchanged back and forth with the powder charge. The milling additive, such as a lubricant, can range from 1 wt % to 2.5 wt %, for example, 1.25 wt % to 1.75 wt %.

Figure 18:
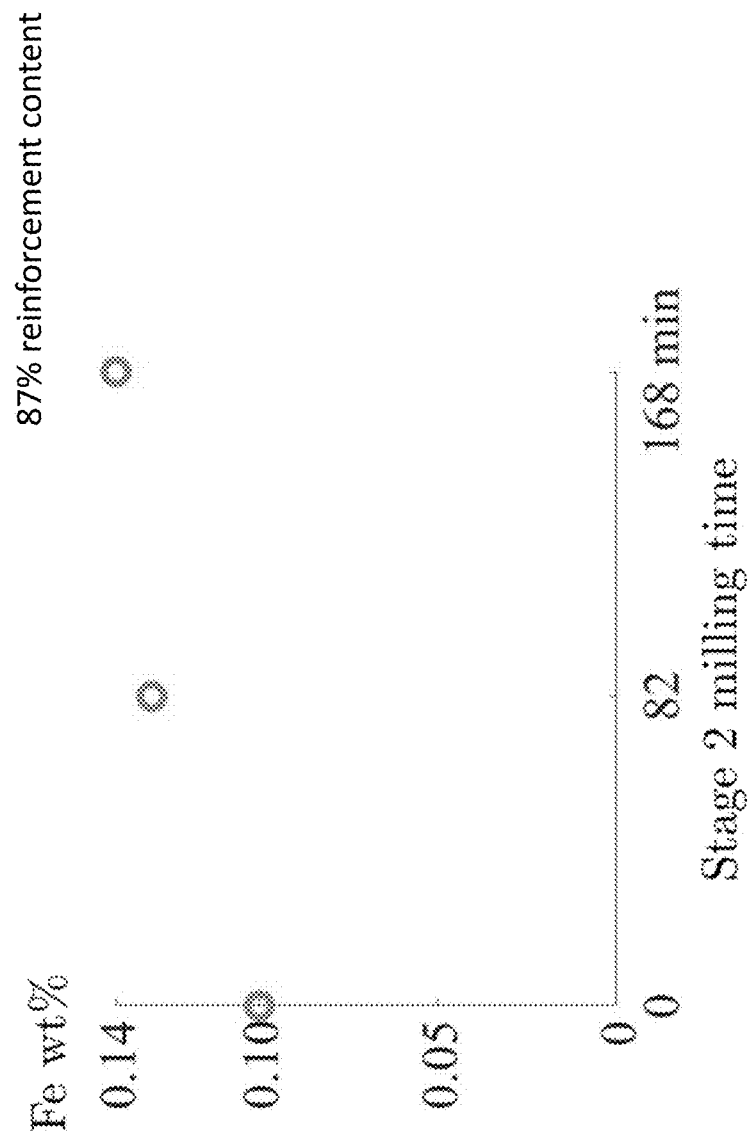
FIG. 18 depicts a graph showing impurity content with a two-stage milling process.

FIG. 18 depicts a graph showing impurity content with two-stage milling using steel bowls and balls. Iron content as a contaminant was only 0.14 wt %, well within specification for selective laser melting (the specification is 0.5 wt %). The milling conditions can be properly adjusted so that the ball coating remains relatively slight during processing and is continuously exchanged back and forth with the powder charge. Iron is a natural impurity that arises during the manufacture of primary aluminum via the Bayer Process that converts bauxite (the ore) into alumina (the feedstock) and the subsequent Hall-Héroult electrolytic reduction process that converts alumina into molten aluminum (>950° C.). Depending on the quality of the incoming ore and the control of the various processing parameters and other raw materials, molten primary aluminum metal typically contains between 0.02-0.15 wt. % iron, with ~0.07-0.10% being average).

Figure 19A:
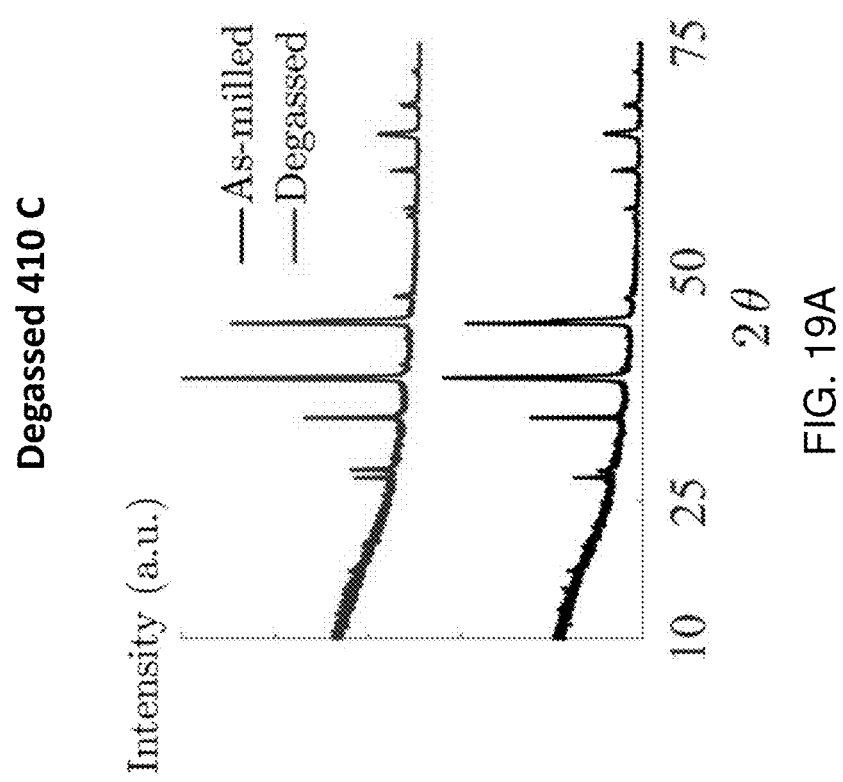
FIG. 19A depicts a graphs showing x-ray diffraction scans of powder samples degassed at 410° C.
Figure 19B:
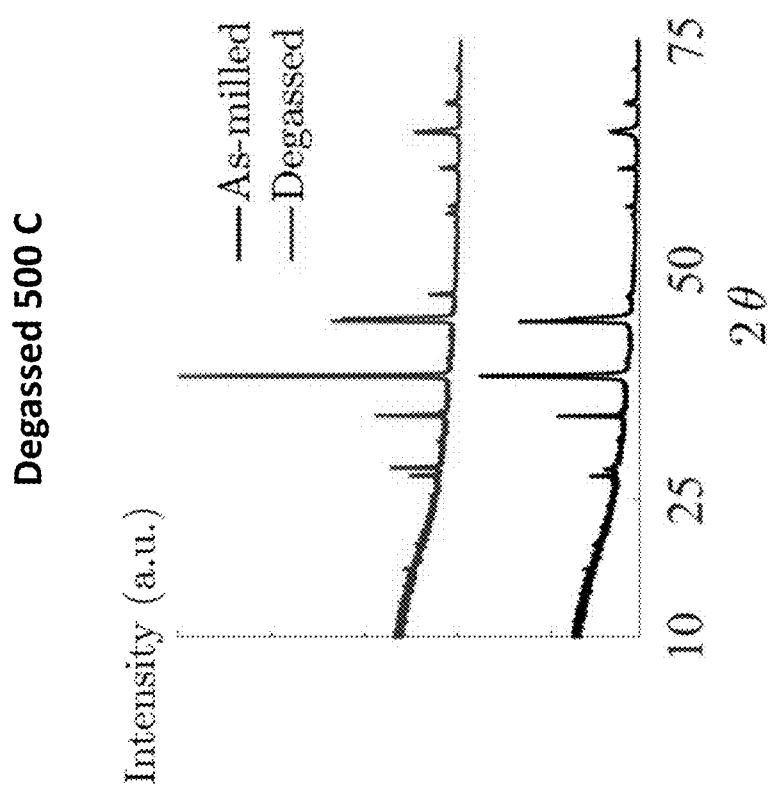
FIG. 19B depicts a graphs showing x-ray diffraction scans of powder samples degassed at 500° C.

Importantly, a low impurity content can allow for high temperature degassing. No new peaks were detected at 410° C. or 500° C., indicating significant intermetallics do not form during degassing. See FIGS. 19A and 19B.

Figure 20A:
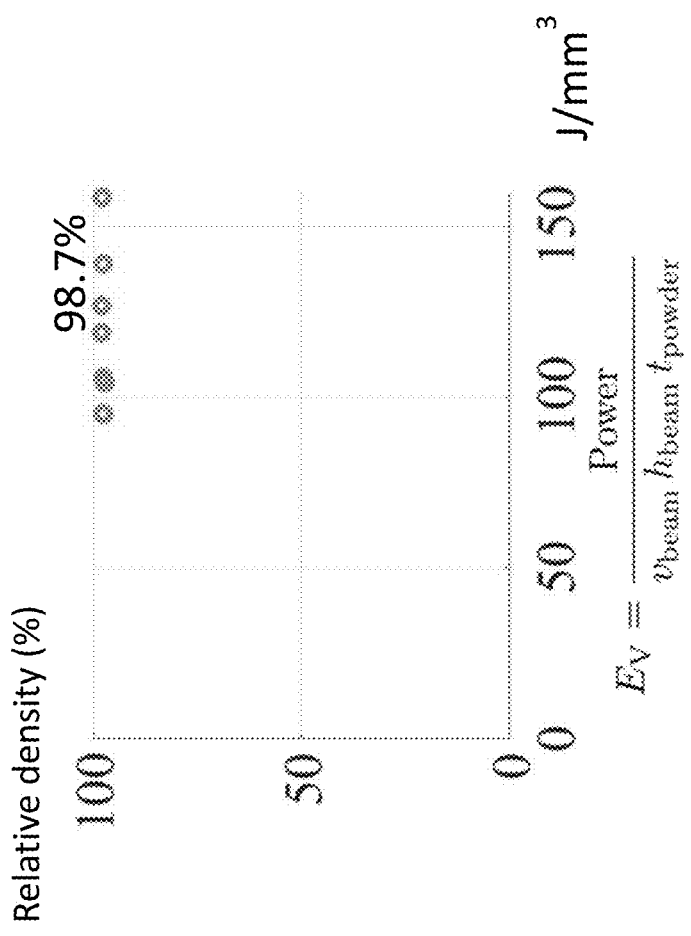
FIG. 20A depicts a graph showing density of a consolidated powder.
Figure 20B:
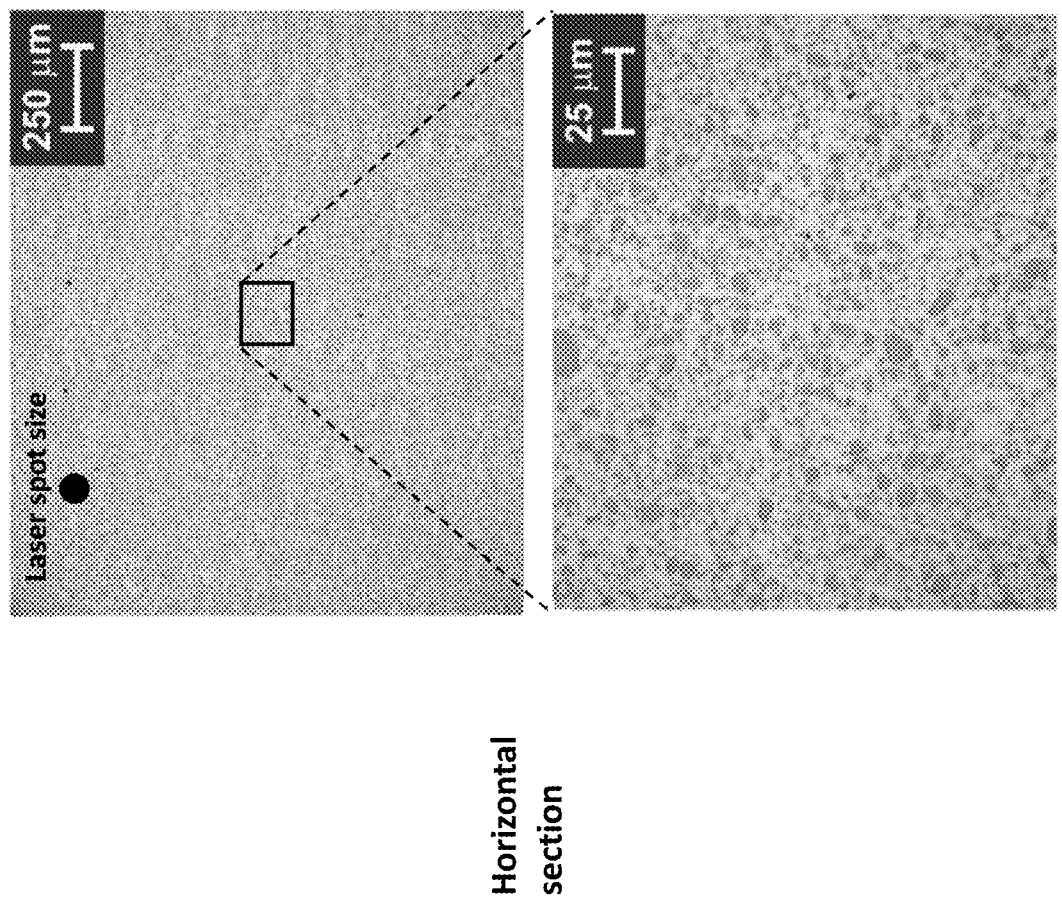
FIG. 20B depicts a micrograph showing a consolidated powder.
Figure 21:
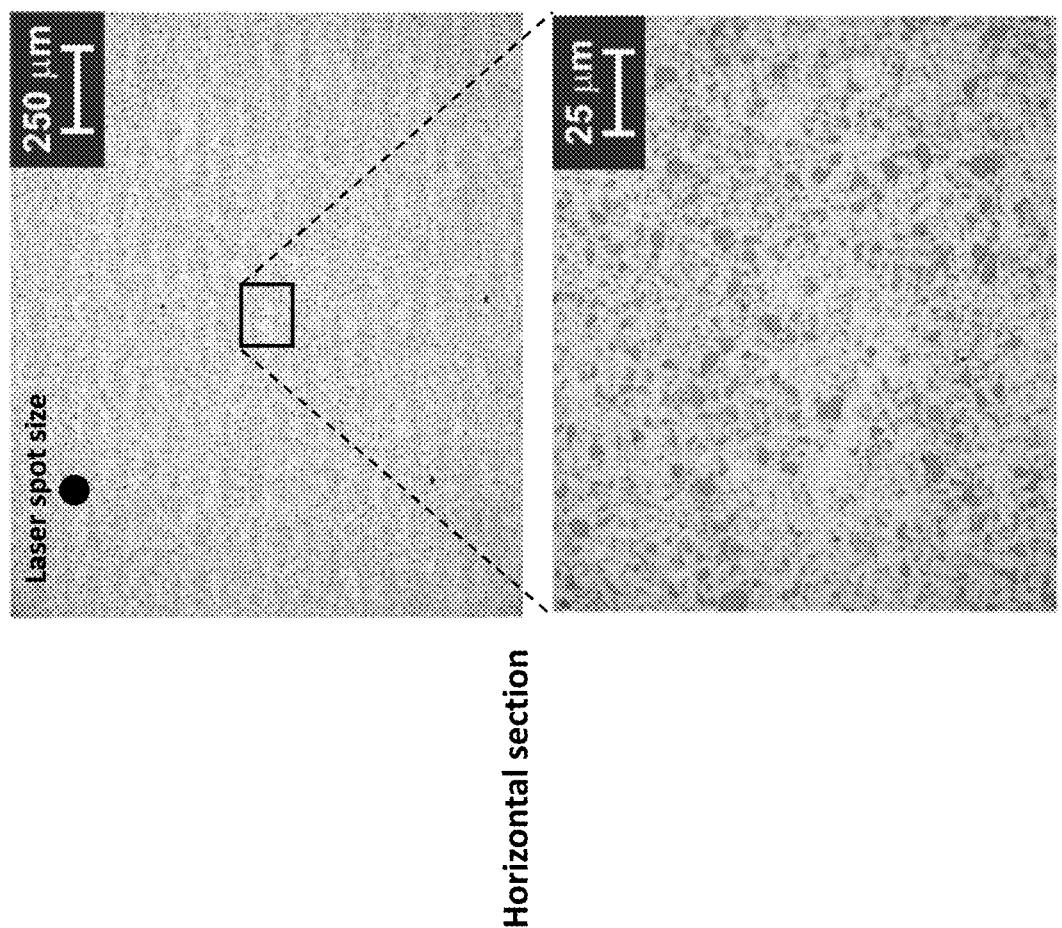
FIG. 21 depicts a micrograph showing a consolidated powder.
Figure 22:
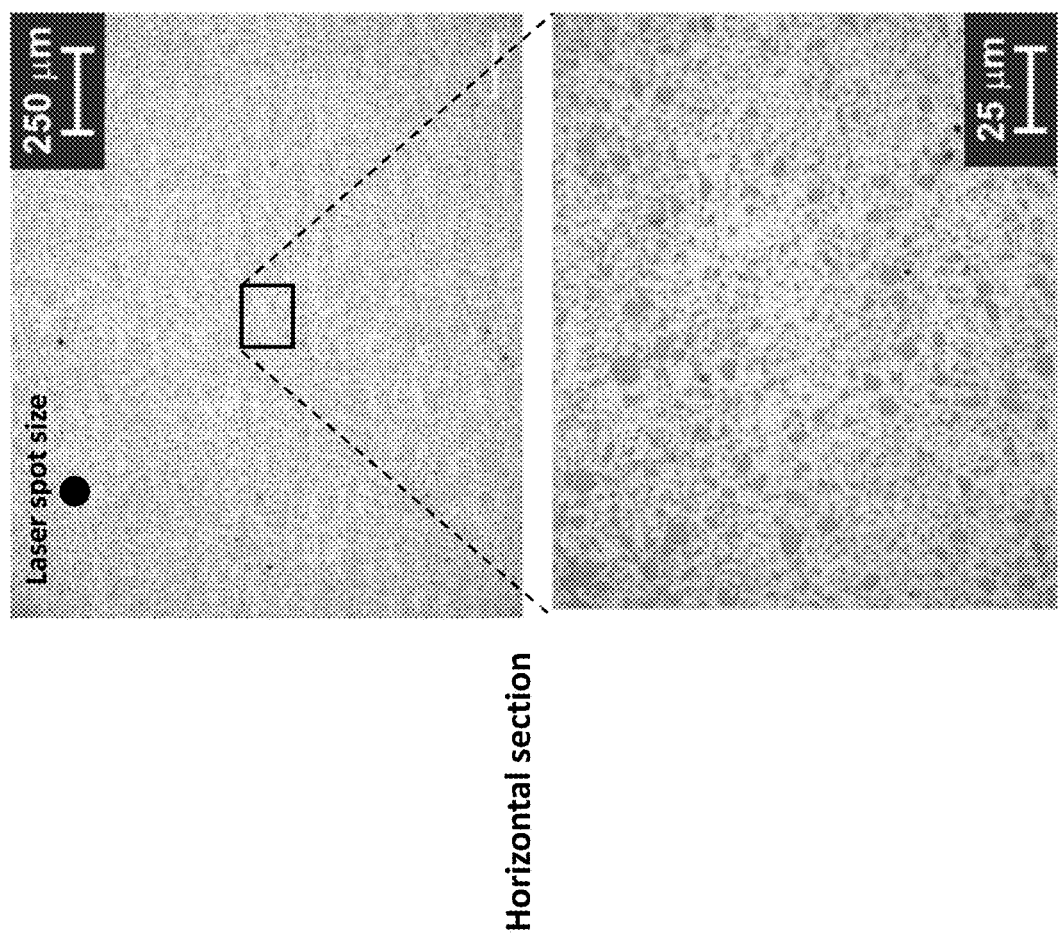
FIG. 22 depicts a micrograph showing a consolidated powder

SLM consolidated of a 30% TiB$_2$ powder (degasses at 410° C.) can have a high density as shown in FIG. 20A, where a relative density of at least 98% was achieved, showing that the material was virtually fully dense, without optimizing laser parameters or particle size distribution. Referring to FIG. 20B, a micrograph of the consolidated powder shows a lack of voids or other defects in the solid product. Increasing degassing T to 500° C. improves consolidation, reaching a whole sample relative density 99.4% (range 98.5-99.6%) for the solid product shown in FIG. 21, which included 23.2 wt % TiB$_2$, a hydrogen content of 32 ppm, and was degassed for 14 h at 500° C. Less laser spatter was observed with the 500° C. degas powder. This densification was achieved without optimizing laser parameters for higher ceramic content and larger PSD. Referring to FIG. 22, a powder milled with steel balls and jars also prints well, having a whole sample relative density 98.5%, containing 25.8 wt % TiB$_2$, degassed 14 h at 410° C. The particle size distribution was not optimized. Importantly, Fe is less likely than W to nucleate new phases.

As the method is transitioned to production scale, the physics can be complex, but the methods and equipment can be surprisingly simple, common, and cost-effective. For example an attrition ball mill can be used that enables one to tens of kilograms of material per batch (vs 100 g now). The method steps can remain the same, but there can be different kinematics than planetary ball mills to optimize. Other scale up components can include a high vacuum furnace, and ultrasonic sieving/sizing. Implementation of kilogram-scale production permits the use of heated build plate to preheat powder, reducing the temperature gradient experienced by the material, a comprehensive study of laser parameters as function of ceramic content, printing of ASTM Type IV tensile bars for study of heat treatment and mechanical properties.

Figure 23:
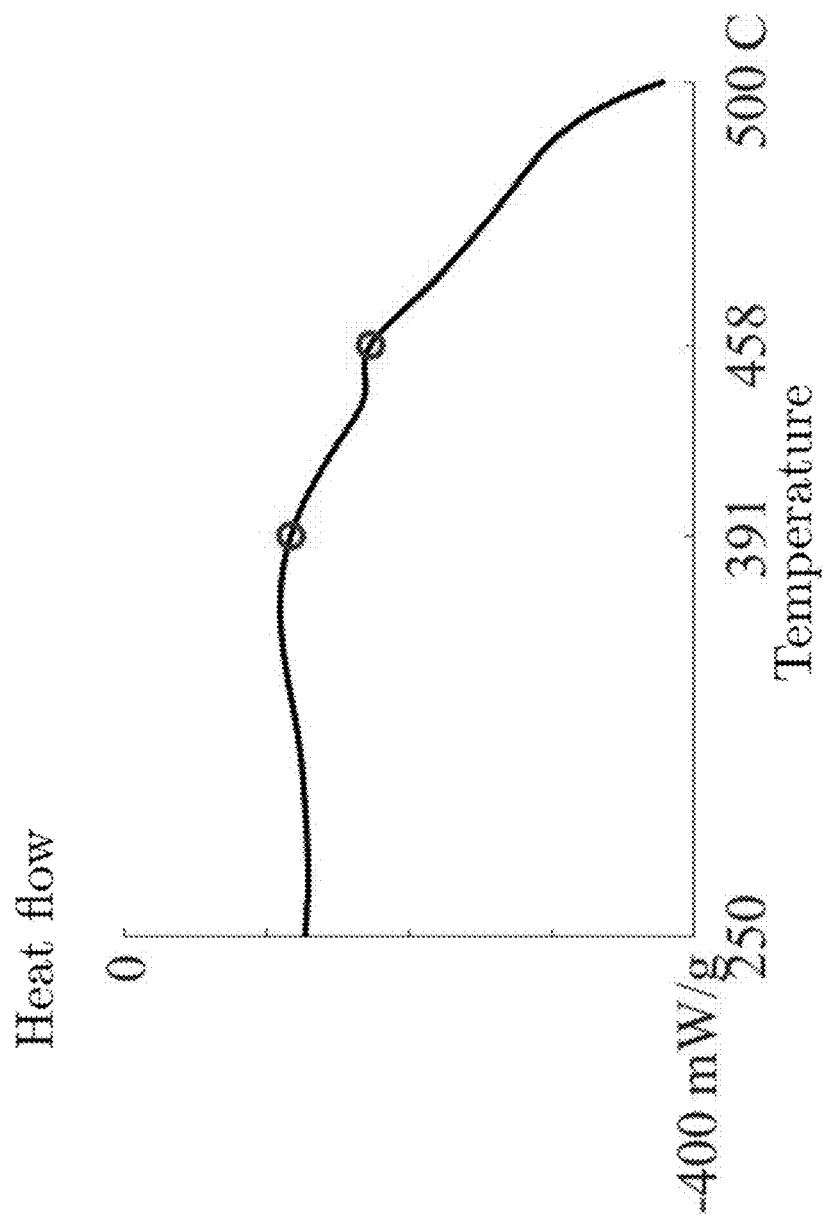
FIG. 23 depicts a graph showing differential scanning calorimetry of an alloyed powder.

Referring to FIG. 23, differential scanning calorimetry detected two reaction exotherms near degassing temperatures (differential scanning calorimetry at 10 C/min).

Figure 24:
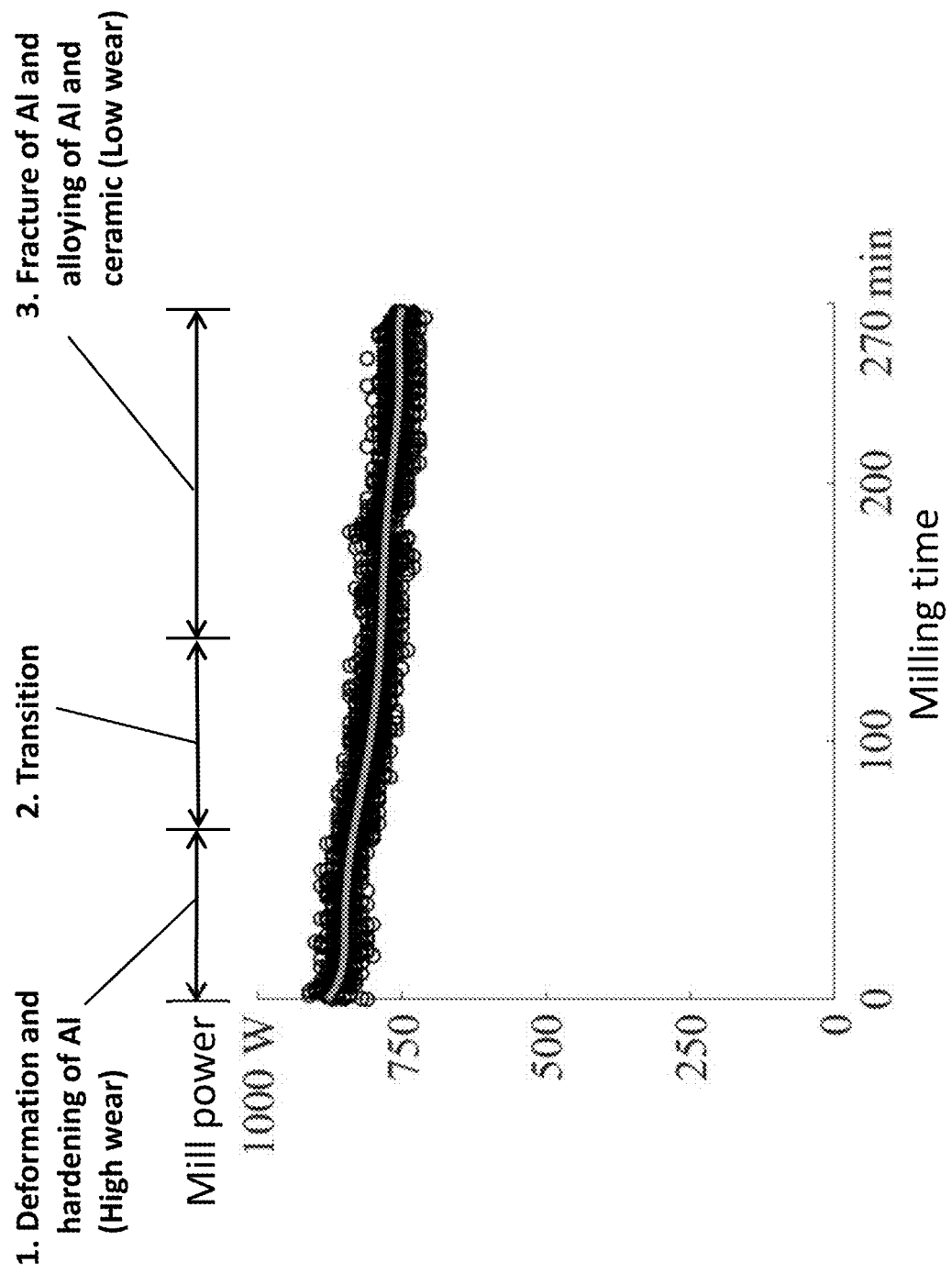
FIG. 24 depicts a graph showing an impact of milling time and mill power.

Referring to FIG. 24, ball mill power can used as indicator of hardness (verified by particle size). It was also observed that some carbide particles were detected that will improve strength. Very few intermetallics were detected that can cause brittle response.

Unexpectedly, the methods described herein can facilitate production of kilogram-level quantities of powder with 95%+ reinforcement fraction and less than 0.1 wt % added impurities (using, for example, an attrition mill). It is possible to achieve about 99% dense consolidation with 3 micron ceramic particles in the alloyed powder. Also, a 50% improvement in stiffness with 10% ductility in ASTM tensile tests, relative to unreinforced Al—Si10-Mg was observed. Highly printable AM powders can be produced by ball milling, including MMCs and other novel materials. This represents a potential lower cost alternative to gas atomized feedstock, leading to production-quality powder at 40-50% ceramic content. The materials described herein can be printable with other metals AM methods including binder jetting and electron beam melting.

The thermomechanical properties of metal matrix composites (MMCs) are ideal for high-performance defense and commercial applications, but fabrication of MMC components with conventional methods is difficult, costly, and restricted to parts with simple geometry. 3D printing MMCs with selective laser melting (SLM) would be an optimal method, but the laser consolidation of these materials has been unable to match the properties of conventionally produced MMCs. Here, by mechanically alloying aluminum alloyed powder and ceramic microparticles, we manufacture highly-reinforced composite powders with morphology tuned for SLM process conditions.

In summary, a printable aluminum matrix composites with uniform distribution of ceramic microparticles can have contents of 30% or higher. The composite powders and consolidation methods can be transferred to production SLM machines and other machines that print metal powders. Reducing degassing temperature to about 360° C. can reduce WC content (or use Fe milling media). Milling additives and milling time can be modified to reduce WC content to about 0.5 wt %. Moreover, it was found that aluminum alloys containing higher amounts of Fe can be routinely degassed at high temperature.

Figure 25A:
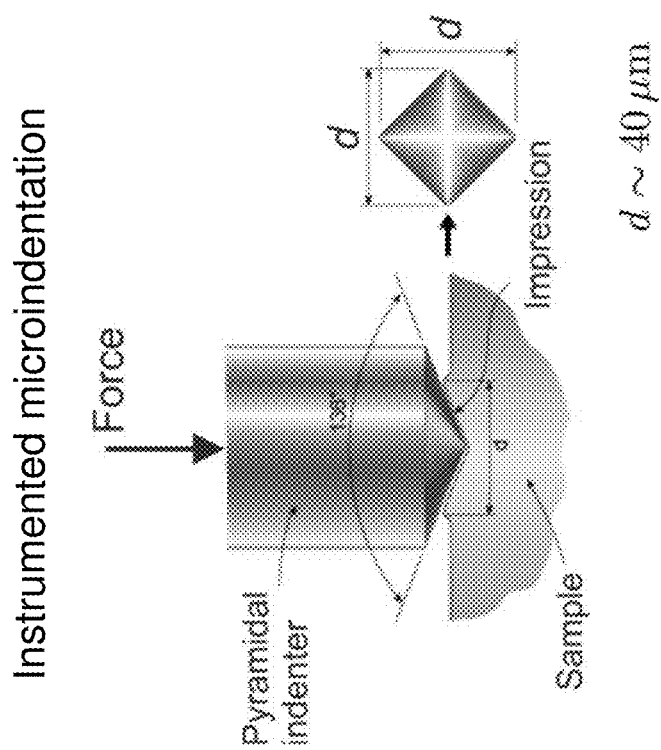
FIG. 25A depicts a schematic showing instrumented microindentation.
Figure 25B:
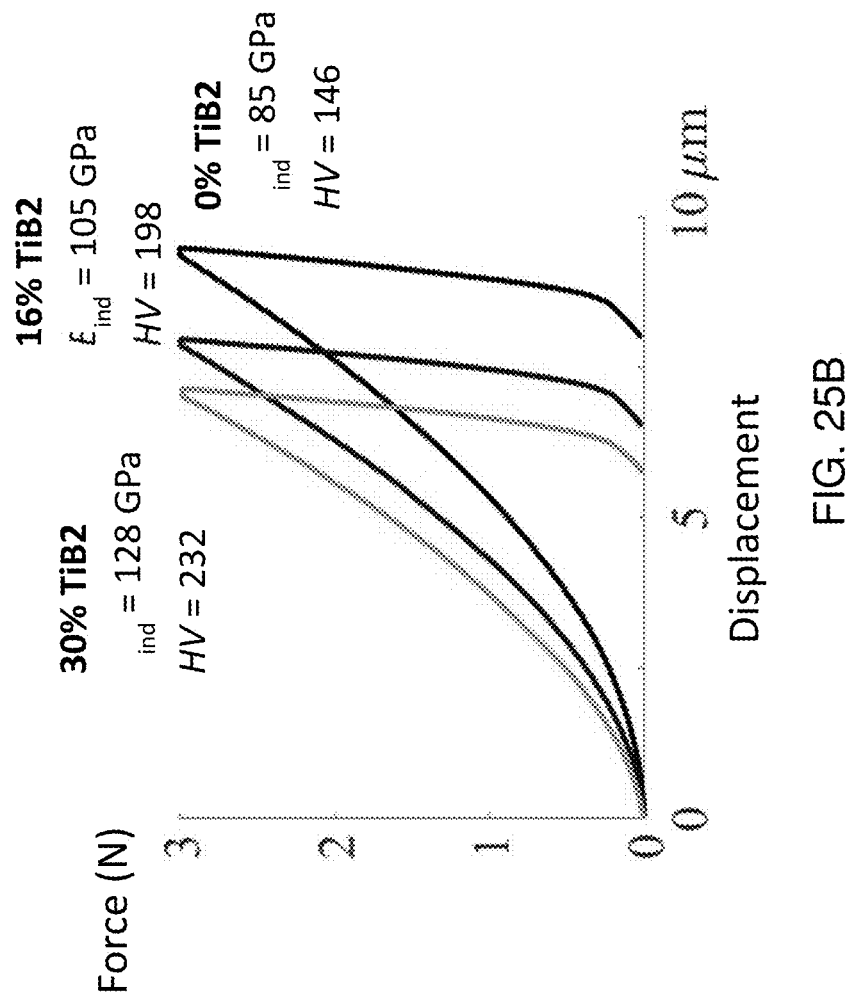
FIG. 25B depicts microindentation results.
Figure 26:
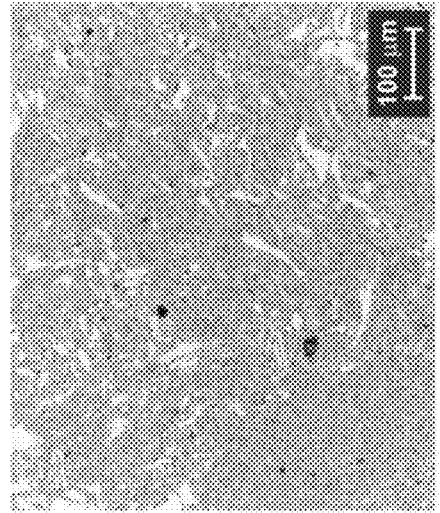
FIG. 26 depicts micrographs comparing the alloy material described herein and a silicon carbide-aluminum material.
Figure 26:
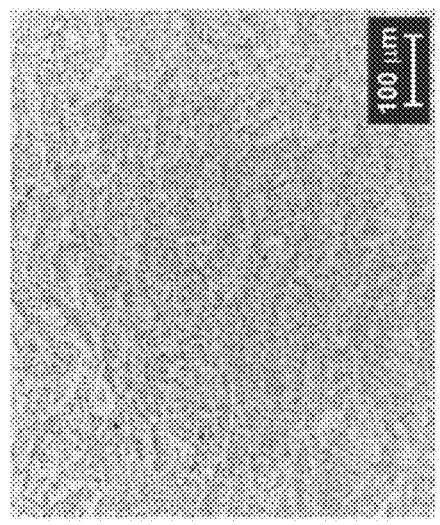

Indentation demonstrates ceramic reinforcement at microscale, as shown in FIG. 25A. Microindentation testing on these samples can show a nice improvement in Vickers hardness and elastic modulus, as measured by the unload portion of the curve. Referring to FIG. 25B, over 50% improvement in stiffness and hardness can be due to the reinforcement effect of the ceramic, (as well as indirect strengthening mechanisms), the consolidated product having up to 51% improvement in indentation modulus, 58% improvement in Vickers hardness, 43% improvement stiffness and 102% improvement in hardness. Initial results at 30 wt % ceramic morphology compares favorably with conventionally made, certified MMC. Referring to FIG. 26, consolidated solids of the alloy material described herein and a silicon carbide-aluminum material made by hot isotactic pressing.

The compositions and methods described herein represent an unexpected improvement over prior compositions and methods. Industrial MMC producers and research organizations have demonstrated that the optimum morphology for MMCs consists of ceramic microparticles (about 1-5 micron) that can be evenly distributed and fully bonded to the matrix at high volume fractions (10-50%). Larger ceramic particles are statistically likely to contain flaws that initiate brittle fracture, limiting the material's usefulness. Brittle fracture also occurs when particles are poorly distributed because stress concentrates within agglomerations of particles. At low volume fractions, smaller, nanoscale particles, about 20-200 nm, have shown promise for improving strength and ductility. However, at high volume fractions, nanoparticles cluster and strongly segregate at grain boundaries, limiting their reinforcement effect. High ceramic volume fractions are critical because, although processing or addition of minor alloying elements can increase strength, increasing the proportion of lightweight elements with stiff atomic bonds is the only method to increase the stiffness of a material.

Prior to the discoveries described herein, aluminium alloys reinforced with high volume fractions of ceramic microparticles are commercially produced in bulk form with casting or powder consolidation by sintering. However, relative to unreinforced alloys, the manufacturing processes are expensive and time consuming, causing MMC raw stock and cast or formed parts to have high cost and long lead times. Furthermore, the hard, abrasive ceramic microparticles cause MMCs to be difficult to machine, adding to the difficulty of implementation and limiting use in parts with complex geometry. As a result, use of MMCs is presently very limited, despite the outstanding thermomechanical properties of these materials.

The methods described herein relate to a new process to fabricate metal matrix composites with AM by methods of powder bed fusion (PBF). In PBF, thin layers of metal powder (30-100 micron) are repeatedly spread over a substrate. After each layer is spread, the powder is selectively consolidated by a high-intensity laser beam or electron beam. The beam consolidates the powder by scanning across the part line-by-line sintering the powder or forming a small, transient melt pool that quickly solidifies into a dense solid material. PBF by full melting is widely recognized as the AM method that produces metal parts with the smallest feature size, highest complexity, and best material properties. With few exceptions, the commercially available powders for PBF are unreinforced alloys produced by gas atomization with near-spherical particles exhibiting a monodisperse particle size distribution.

In certain aspects, a method of fabricating composite powders with composition and morphology optimized for consolidation by PBF is described herein. This method, mechanical alloying by ball milling, has been used to produce alloy and composite powders for consolidation by casting or hot isostatic pressing, but its successful application to PBF is novel. With ball milling, steel, ceramic, or cermet bowls are loaded with both a powder mix and balls made from a material similar in composition to that of the bowls. The balls are agitated with various methods, depending on the type of ball mill. At high input powers, ball milling causes mechanical alloying. During mechanical alloying, impacts between balls and between balls and the bowl repeatedly deform, fracture, and cold weld the intervening particles such that the final milled powder is composed of particles that are each a composite or alloy of the starting mixed powder. See, FIG. 3. Composite particles made by mechanical alloying can have ceramic volume fractions of at least 40%, based on the example of a commercial MMC that is made by ball milling and hot isostatic pressing. (Ceramic volume fractions of 50% have been reported in the literature.)

Ball milling has been used before to produce powders for PBF, but typically the mill is operated at low specific powers as primarily a mixing unit so that the metal particles remain spherical. Under these conditions, no substantial alloying of the powders occurs.

As described herein, atomized metal powder designed for PBF in both composition and size is first gently mixed with a high volume fraction of ceramic microparticles (10% or greater, size about 1-10 micron). For example, the volume fraction of ceramic microparticles can be 10%, 12%, 14%, 16%, 18%, 20%, 22%, 24%, 26%, 28%, 30%, 32%, 34%, 36%, 38%, 40%-42%, 44%, 46%, 48% or 50%. The microparticles can have an average size of 0.5 micron to 5 microns, for example, 0.5 microns, 1 micron, 1.5 microns, 2 microns, 2.5 microns, 3 microns, 3.5 microns, 4 microns, 4.5 microns, 5 microns, 5.5 microns, 6 microns, 6.5 microns, 7 microns, 7.5 microns, 8 microns, 8.5 microns, 9 microns, 9.5 microns or 10 microns. A ceramic is selected that will not substantially melt or react when in contact with the molten metal at the temperatures of PBF. The particle size distribution of the mixed powder is bimodal, and the powder does not flow or pack well because the small ceramic particles interfere with the rolling of the aluminum particles. Poor flowing powder does not perform well in PBF machines because the spreading mechanism cannot deposit the thin, uniform, and well-packed layers that are required for high-quality consolidation.

In order to maximize both powder flowability and the mechanical properties of the consolidated material, the mixture of metal powder and ceramic microparticles is mechanically allowed at high energy in a ball mill. Via fracture and cold welding, the heterogeneous mixture is transformed into a homogeneous blend in which each particle in the powder is a metal reinforced with a uniform distribution of ceramic microparticles. See, for example, FIGS. 6B, 6C and 7. The bimodal distribution of starting material particle sizes for a monodisperse alloyed powder, which can have superior flowability as a result of the unexpected transformation from a bimodal distribution state. Mechanical manipulation of the mixture lead to a class of materials that have physical attributes that make them useful in additive manufacturing, for example, material flowability. Moreover, the ball milling can reduce the ceramic particle size to about 0.5 micron to 5 microns, for example, 0.5 microns, 1 micron, 1.5 microns, 2 microns, 2.5 microns, 3 microns, 3.5 microns, 4 microns, 4.5 microns, or 5 microns.

After milling, the composite powder can be mechanically sieved to the size required by the PBF machine. This uniform blend of metal and ceramic, with intimate contact between the phases in the solid state, promotes even distribution and full wetting of the ceramic microparticles during laser consolidation. It has been commonly assumed that the deformed, non-spherical shapes of mechanically alloyed particles cause poor powder flowability, but the methods described herein include a milling process that produces powders with good flow characteristics. The ball milling and sieving can cause an equiaxed particle shape and a monodisperse particle size distribution that allow the composite powder to be spread in thin, uniform layers by a standard PBF machine. The key milling parameters can include one or more of: composition and morphology of the metal alloy in the powder; composition, morphology, and content of the ceramic in the powder; total energy input per mass of powder (normalized energy); fill ratio of the bowls; balls-to-powder weight ratio (BPR); impact energy of each collision between the balls and the bowl; and the duration of milling intervals and intervening rest intervals that limit the temperature rise of the material The mechanical alloying process can include a method to minimize the effect of contamination of the powder by minor milling additives, moisture, and by the milling bowls and balls themselves. When ball milling ductile metals such as aluminum or aluminum alloys, a surface-active agent, or "process control agent (PCA)," must be added to suppress the strong tendency of the metal powder to cold weld to itself and the milling media. The majority of PCAs are organic compounds, such as alcohols or fatty acids, that contain substantial hydrogen. The PCAs can include a C6 to C24 fatty acid, such as stearic acid. Moisture adsorbed from the environment is another source of hydrogen. Hydrogen that remains in the powder after ball milling can lead to defects in the form of gas porosity in the consolidated material. Excessive contamination by the milling media can also cause defects in the consolidated material because intermetallic compounds can form that cause hot tearing, destabilize the melt pool, or reduce the fluidity of the molten metal.

Contamination by the milling media can be reduced or minimized by the selection of mill parameters and/or using wear-resistant milling media, rather than the more common stainless steel media. Powders with high volume fractions of ceramic microparticles are very abrasive and can quickly wear away stainless steel milling media, resulting in high levels of iron in the powder. To an extent, contamination can be limited by reducing energy input, increasing fill ratio, reducing BPR, and reducing impact energy. However, some contamination is inevitable because a large amount of energy must be delivered to the powder at a minimum BPR and impact energy in order to cause uniform alloying of the metal and ceramic.

In one aspect, a large majority of hydrogen in the powder can be removed after ball milling with vacuum degassing. The composite powder can be degassed either under a high vacuum or a continuous flow of argon at low vacuum. Under these conditions, the hydrogen content of the milled composite powders is reduced to a level close to the hydrogen content of gas atomized, unreinforced alloyed powders. Degassing temperatures and durations can be selected that do not cause sintering the powder or the formation of harmful intermetallics. Sintering limits the ability of the PBF machine to spread thin, uniform layers of powder and intermetallics can prevent high-density consolidation. After vacuum degassing, the composite powder can be consolidated with a standard commercial PBF machine. The thickness of each powder layer and the other spreading parameters are the same as those normally used in the machine with the unreinforced alloyed powder. The laser power, scan velocity, hatch spacing, and raster pattern can be optimized so that the relative density of the consolidated material is at least 95%, at least 97% or at least about 99%.

Following consolidation, one or more heat treatments can be used to relieve stress and increase strength or ductility. The heat treatment can include heating the sintered structure to 100° C., 200° C., 250° C., 300° C., 350° C., 400° C., 450° C., or 500° C.

The methods and composite materials described herein have various advantages and provide many improvements over existing methods. The advantages are unexpected. Fabrication of MMC components by the conventional methods of casting or powder metallurgy can be slow, expensive, and limited to parts with simple geometries. The ability to manufacture MMC parts additively can enable the use of high-performance materials for the first time in components requiring complex shapes. On the other hand, for parts with simple geometry, use of high-performance materials would be feasible on short schedules and for small production runs because no costly tooling is required. Because there is no significant waste of material with AM, the costs would be limited to the cost of the powder actually consolidated and the expense to run the AM machine.

As described herein, a method to fabricate highly-reinforced MMCs with AM can use cost-effective methods and proven technologies. At scale, the cost of composite powders produced by mechanical alloying can be potentially lower than the cost of unreinforced metal powders made for AM by the typical method of gas atomization. The ceramic reinforcements can be micron-sized, similar in size to the grains of the matrix alloy. This type of microstructure has been proven commercially and can be used in many critical structural applications, including in space, aviation, sporting goods, and motorsports.

Consolidation of the composite powder can be performed with power bed fusion using a commercial machine. PBF techniques include selective laser melting (SLM), electron beam melting, and selective laser sintering. SLM was used in the example application because it is widely recognized as the best AM technique for producing complex metal parts with high structural integrity and surface quality, typical of high-value components. It is also the most commonly used AM method for metals by a large margin. However, the materials described herein can be used in other PBF techniques. In addition, aspects of the methods and composite materials described herein can be used in other powder-based AM methods, such as directed energy deposition and metal binder jetting.

Advantages with other used or proposed AM methods can include the following:

1. Mechanical Mixing

Gas atomized metal powder and ceramic powder are not mechanically alloyed but simply mixed with a shaker mixer or by low-energy ball milling. At any substantial volume fraction, the powders do not spread well in the machine, and the powder bed may be non-uniform. Often the layer thickness must be increased. The ceramic particles can segregate in the powder bed and tend to cluster in the consolidated material. Because the two phases are only in limited contact in the powder, the metal often does not fully wet and bond to the ceramic.

2. Decoration

The ceramic particles are lightly adhered to the surface of gas atomized metal particles with moderate-energy ball-milling, electrostatic assembly, or agent-assisted deposition (Clare and Kennedy, US 2016/0279703 A1, which is incorporated by reference in its entirety). This method is limited to low volume fractions of ceramic (about 2-5%) because only a single layer of nanoparticles or small microparticles can cover each metal particle. Compared to mechanical mixing, powder flowability and powder bed uniformity are improved. At this ceramic content, strength can be substantially improved but stiffness is not appreciably increased. Distribution in the melt, wetting, and bonding are inferior to the case of mechanically alloyed powders.

3. Pre-Alloyed Powders

During the powder production process, the ceramic particles can be synthesized in-situ by chemical reaction in the molten state, after which composite powders are manufactured by gas atomization. Limited to certain chemistries, this method is expensive, hard to control, and cannot produce ceramic contents greater than about 7% by volume. Furthermore, the ceramic particles are nano-sized, much smaller than the metal grains, and therefore usually agglomerate at the grain boundaries.

In contract, in the mechanical alloying described herein, the ceramic particles are introduced ex-situ, as microparticles, and can be a variety of compounds at high volume fraction, such as borides, carbides, oxides, or nitrides.

4. In-Situ Reinforcement

The ceramic reinforcements are synthesized in-situ during the laser consolidation process (e.g., Nuechterlein and Iten, US 2016/0271878 A1, which is incorporated by reference in its entirety—the only commercially available method). Like pre-alloyed powders, the in-situ method is limited to certain constituent chemistries. Because of the high cooling rates during laser AM, the chemical reaction time is short, causing reinforcements to be nanoscale (20-200 nm) and present at relatively low volume fractions (10% or less, thus far). Disadvantages of this approach include unreacted elements or compounds with high melting point that embrittle the material and exothermic chemical reactions that destabilize the melt pool, causing defects in the consolidated part. In addition, the efficacy of nanoparticle reinforcement at high ceramic content is still unproven. Nanoparticles are prone to agglomerate at grain boundaries, and high loadings dramatically increase the viscosity of the melt pool, which can cause incomplete fusion of layers.

As a result of at least some of these advantages, additive manufacturing of highly-reinforced MMCs can be particularly attractive to organizations that manufacture high precision aerospace systems. Structural components fabricated from MMCs can be stiffer and more stable than those fabricated from unreinforced metals. Because the mass of support structures routinely can be 50-80% of a system's total mass, use of MMCs for lightweighting can enable substantial increases in payload capacity, range, and energy efficiency. Increasing stiffness and reducing weight can also reduce or alleviate the need for complex vibration isolation systems, decreasing system weight further and reducing cost. Moreover, the ability to tune material properties by varying ceramic content can enable thermal expansion matching of components, allowing new material combinations to be accessed with the methods described herein.

Examples of the methods and composite materials described herein follow.

Description of Application to Selective Laser Melting of Aluminum Alloy Al—Si10-Mg and Ceramic $TiB_2$ The methods described herein were applied to Al—Si10-Mg gas atomized aluminum powder (Carpenter Additive, 20-63 micron) and $TiB_2$ ceramic powder (H. C. Starck, 1-8 micron). Powders were mixed at ceramic weight fractions of 16.0% and ball milled with 2 wt % stearic acid using tungsten carbide-cobalt (WC—Co) bowls and balls. In this example, a form of ball milling termed planetary ball milling was used. With planetary ball milling, the bowls are clamped to a disc that rotates at high speed while the bowls are spun about their own axes at a similar rate of rotation. The milling parameters were selected to produce powders with the required composition and morphology while limiting WC—Co contamination to volume fractions of less than about 0.5%. After sieving to 20-63 micron, the composite powder was then degassed at a temperature of 410° C. for 8-14 hours.

Figure 8:
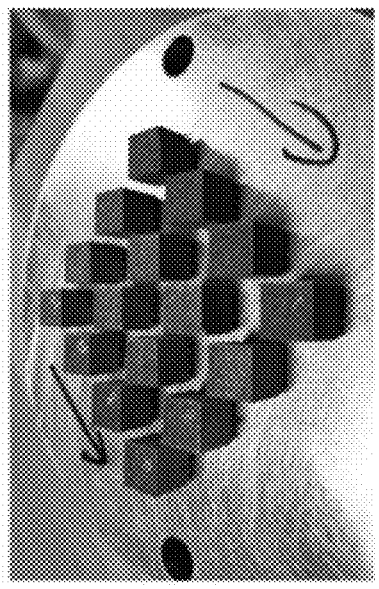
FIG. 8 depicts cubes printed with a laser consolidation system.
Figure 9:
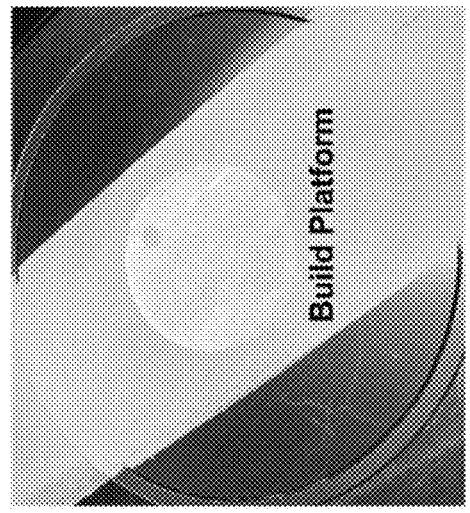
FIG. 9 depicts composite powder spreading by a recoater.
Figure 9:
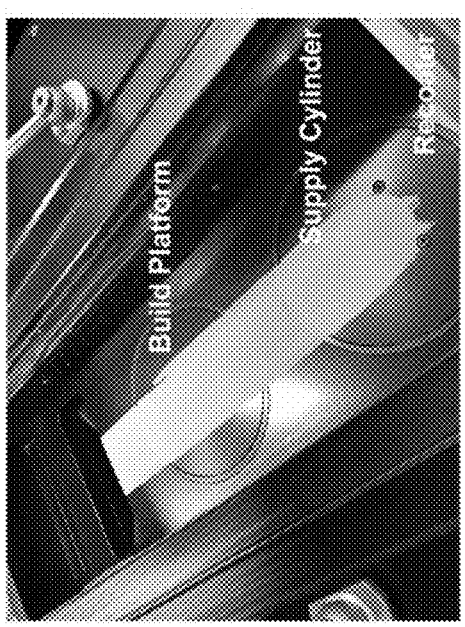

After degassing, the composite powders were consolidated in a commercial selective laser melting (SLM) machine. See, FIG. 8. SLM (trademarked) uses a high-intensity laser to melt fully and consolidate the powder. The standard layer thickness for gas atomized Al—Si10-Mg powder was used (30 micron, FIG. 9), but the laser power, scan velocity, and hatch spacing were modified from the values typically used for this powder. With an initial ceramic weight fraction of 16.0%, or a theoretical solid volume fraction of 10%, a total of 14 samples were built with length and width of about 10 mm and height of about 5 mm. The composite powder was consolidated to overall relative densities of 96.52-99.08%, as measured by the Archimedes method. See, FIG. 6A and FIG. 10. The relative density of the samples is a function of the laser parameters, with the highest density of 99.08% occurring at laser power 250 W, scan velocity 750 mm/s, and hatch spacing 80 micron. Most of the pores in this sample occurred near the edges because the perimeter scans were not optimized. This sample was sectioned and polished, and optical microscopy revealed that the microstructure is virtually 100% dense away from the edges of the sample. Furthermore, the ceramic particles are intact, evenly distributed, and well bonded to the aluminum matrix, and significant reaction or melting was not observed.

The results of similar experiments that did not follow the exact procedure described above indicate that theoretical ceramic volume fractions of at least 20% are possible with the methods described herein. Experiments were also performed with Al—Si10-Mg metal powder and an initial $TiB_2$ weight fraction of 29.7%, or a theoretical solid volume fraction of 20%. In one experiment, nearly fully dense consolidation was achieved, but stainless steel milling media had been used, leaving a high level of iron in the powder that caused hot tearing defects. In another experiment, WC—Co media were used but the degassing temperature was increased to 450 C and the relative density was limited to 95.1%. X-ray diffraction of the degassed powders and optical microscopy of the consolidated samples revealed that the intermetallic tungsten aluminide had formed at this temperature, causing melt pool instabilities and large, irregular pores in many sections of the samples. However, a few sections exhibited fully dense consolidation and well-distributed, well-bonded ceramic particles (FIG. 26), which supports the theory that intermetallics, not higher ceramic content, caused the incomplete consolidation. Based on the examples of composite powders from industry and the literature, ceramic volume fractions of 40-50% can be achieved with the methods described herein.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. A method of manufacturing a composite powder, the method comprising:
   milling a metal powder until the metal particles are equiaxed in shape and have reached a predetermined saturation hardness value, creating a hardened metal powder;
   milling a mixture of the hardened metal powder and a predetermined volume percent (vol %) of ceramic powder microparticles until the ceramic microparticles are uniformly distributed within the metal particles and a particle size distribution has a single peak to composite powder; and
   degassing the composite powder, to remove hydrogen to a level lower than a predetermined level of hydrogen measured in ppm without causing the sieved composite powder to sinter,
   wherein the degassed composite powder has a flowability flow time, as measured by a Hall flowmeter, in a range greater than or equal to 80 s per 50 g and less than or equal to 120 s per 50 g.

2. The method of claim 1, wherein milling includes high energy ball milling or planetary ball milling.

3. The method of claim 1, wherein the metal powder includes aluminum, steel or titanium.

4. The method of claim 1, wherein the ceramic powder includes a titanium boride, a titanium carbide, a boron carbide, a boron nitride, or a boron suboxide.

5. The method of claim 1, wherein milling includes ball milling with steel or tungsten carbide balls.

* * * * *